United States Patent
Koujima et al.

(10) Patent No.: US 6,916,530 B2
(45) Date of Patent: Jul. 12, 2005

(54) PERPENDICULAR MAGNETIC RECORDING MEDIUM

(75) Inventors: Jun Koujima, Hiroshima-ken (JP); Teruaki Santoki, Ohtake (JP); Masaaki Maekawa, Hiroshima (JP); Takanori Doi, Hatsukaichi (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/255,075

(22) Filed: Sep. 26, 2002

(65) Prior Publication Data

US 2003/0143434 A1 Jul. 31, 2003

(30) Foreign Application Priority Data

Oct. 24, 2001 (JP) ........................................ 2001-327015

(51) Int. Cl.[7] .............................. G11B 5/66; G11B 5/70; H01J 1/00
(52) U.S. Cl. ................. 428/336; 428/611; 428/694 TS; 428/694 TM; 428/900
(58) Field of Search ..................... 428/694 TS, 694 TM, 428/336, 900, 611

(56) References Cited

U.S. PATENT DOCUMENTS 4,828,919 A * 5/1989 Kitakami et al. ........... 428/336
5,543,221 A * 8/1996 Kitakami et al. ........... 428/332
6,268,024 B1   7/2001 Doi et al. .................... 427/537

FOREIGN PATENT DOCUMENTS

| EP | 0945858 A1 | 9/1999 |
| EP | 0 945 858 A1 | 9/1999 |
| EP | 1 113 425 A1 | 7/2001 |
| EP | 1113 425 A | 7/2001 |
| JP | 59-157828 | 9/1984 |
| JP | 59157828 A | 9/1984 |
| JP | 60-95721 | 5/1985 |
| JP | 60095721 A | 5/1985 |
| JP | 06139542 A | 5/1994 |
| JP | 6-139542 | 5/1994 |

* cited by examiner

Primary Examiner—Holly Rickman
(74) Attorney, Agent, or Firm—Nixon & Vanderhye P.C.

(57) ABSTRACT

A perpendicular magnetic recording medium, comprises a substrate; a soft-magnetic layer formed on the substrate; an NaCl-type oxide layer for orientation control formed on the soft-magnetic layer, having a thickness of from more than 0 to less than 10 nm; and a magnetic recording layer formed on the NaCl-type oxide layer for orientation control, comprising a maghemite thin film. Such a perpendicular magnetic recording medium is capable of showing excellent magnetic properties, a high recording resolution and improved surface properties.

21 Claims, 5 Drawing Sheets

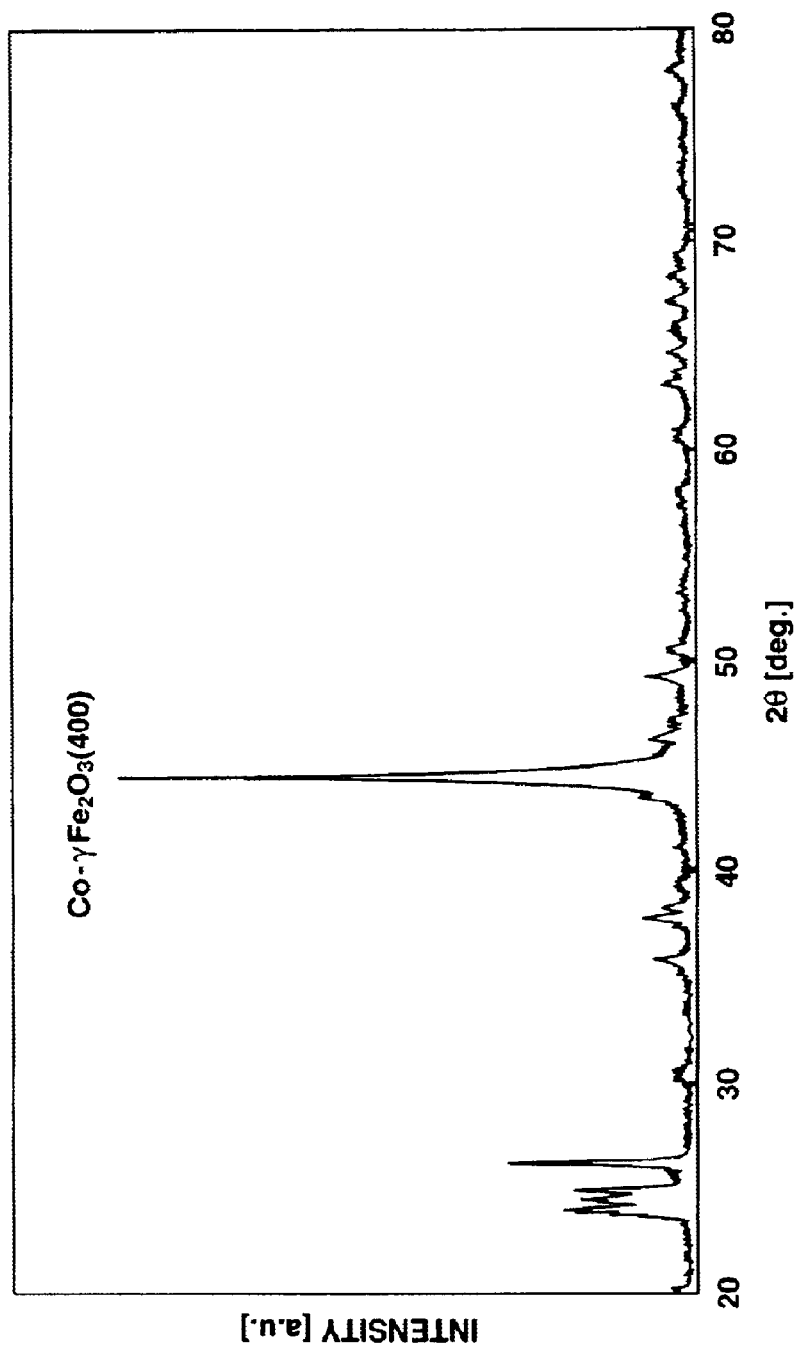

PERPENDICULAR MAGNETIC RECORDING MEDIUM

BACKGROUND OF THE INVENTION:

The present invention relates to a perpendicular magnetic recording medium, and more particularly, to a perpendicular magnetic recording medium capable of showing excellent magnetic properties, a high recording resolution and improved surface properties.

In recent years, in magnetic recording apparatuses, it has been more increasingly demanded to provide magnetic recording media having a high recording density property and a high reliability in order to deal with a large capacity data. Especially, in hard disk drives, there has been a remarkable tendency of a miniaturization and a high reliability in accordance with information devices being miniaturized and systems used therefor being required to have a high reliability.

In order to satisfy such properties, the magnetic recording media have been strongly required to have not only a high coercive force, but also a reduced distance (magnetic spacing) between a magnetic recording layer and a magnetic head.

As magnetic recording media having a high coercive force, there are widely known magnetic recording media comprising a substrate and a magnetic thin film formed on the substrate, in case of the hard disk drives.

The magnetic thin films already practically used in magnetic recording media, are generally classified into magnetic oxide thin films composed of maghemite or the like ("Technical Report of Electronic Telecommunication Institute", published by Electronic Telecommunication Institute, (1981) MR81-20, pp. 5 to 12; "Ceramics", published by Japan Institute of Ceramics, (1986) Vol. 24, No. 1, pp. 21 to 24; and Japanese Patent Publication (KOKOKU) Nos. 51-4086(1976) and 5-63925(1993)), and magnetic alloy thin films composed of Co—Cr based alloy or the like.

The magnetic oxide thin films composed of maghemite or the like are excellent in oxidation resistance or corrosion resistance due to inherent properties of oxides. As a result, the magnetic oxide thin films can show an excellent stability independent of the passage of time, and a less change in magnetic properties with the passage of time. Further, since the oxides exhibit a higher hardness as compared to metals, the magnetic oxide thin films do not require a protective layer to be formed thereon. Even if the protective layer is formed on the magnetic oxide films, the thickness of the protective layer can be reduced as compared to that required for magnetic alloy films. As a result, the magnetic oxide thin films can exhibit a smaller magnetic spacing than that of the magnetic alloy thin films. Therefore, the magnetic oxide thin films are most suitable for production of ultra-high density magnetic recording media.

The magnetic alloy thin films composed of Co—Cr based alloy or the like, have a coercive force as high as not less than 159 kA/m (2,000 Oe). However, these alloy materials themselves tend to be readily oxidized and, therefore, deteriorated in stability independent of the passage of time as well as magnetic properties with the passage of time.

In order to prevent the deterioration of magnetic properties due to the oxidation, the surface of the magnetic alloy thin film is coated with a protective layer composed of carbon, $SiO_2$ or the like, which has a thickness of usually about 5 to 10 nm, resulting in undesired increase of magnetic spacing by the distance corresponding to the thickness of the protective layer.

On the other hand, in order to reduce the magnetic spacing of magnetic recording media, it is required to minimize the flying height of a magnetic head therefrom, and always allow the magnetic head to be flying stably. In conventional hard disk drives, magnetic recording media used therefor have been required to have a certain surface roughness in order to prevent the magnetic head from being absorbed thereon owing to a meniscus force therebetween upon stopping the magnetic head. However, as a result of current improvement in these hard disk systems, magnetic recording media have been no longer required to have such a surface roughness for preventing the magnetic head from being absorbed thereon. Also, it is known that the non-smooth surface of magnetic recording media causes media noise upon reproducing by the magnetic head. Therefore, in order to reduce such a media noise, the magnetic thin film used in the magnetic recording media is required to have a more excellent surface smoothness. In addition, with the decrease of the flying height of the magnetic head (distance between the media and the magnetic head), the thickness of the protective layer formed thereon tends to be reduced. For this reason, it has been further demanded that the magnetic recording layer in itself exhibits an excellent durability.

On the other hand, there are conventionally known two systems of magnetic recording methods, i.e., a perpendicular recording system and a longitudinal recording system. The perpendicular magnetic recording media are considered to be promising as future higher-density recording media, because of being less influenced by thermal fluctuation that will be caused upon achieving the ultra-high recording density (for example, "Nikkei Electronics", Sep. 25, 2000, No. 779, etc.). That is, the perpendicular recording system is suitable for realizing the ultra-high recording density, since the influence of a demagnetizing field on residual magnetization of the media is lessened as a recording wavelength therefor becomes shorter.

Conventionally, there have been proposed magnetic recording media of a perpendicular recording system comprising a Co—Cr based perpendicular magnetic recording layer and a soft-magnetic (low-coercive force) backing layer such as a Ni—Fe based underlayer (hereinafter referred to merely as "soft-magnetic layer") formed underneath the perpendicular magnetic recording layer. When such a soft-magnetic layer as an auxiliary magnetic pole is provided, it is possible to not only enhance the recording magnetic field produced by the single-pole magnetic head as a main magnetic pole, but also reduce a demagnetizing field of the magnetic recording layer after recording (Japanese Patent Application Laid-Open (KOKAI) No. 54-51804(1979), etc.).

As the perpendicular recording system, there have been proposed 1) a method of using a perpendicular magnetic layer provided with no soft-magnetic layer and a ring head; 2) a method of using a perpendicular magnetic layer provided with the soft-magnetic layer (perpendicular double-layered media) and a ring head; and 3) a method of using a perpendicular magnetic layer provided with the soft-magnetic layer and a single-pole magnetic head. An optimum method for realizing the ultra-high recording density is the above method 3) (for example, "Nikkei Electronics", Jul. 1, 1996, No. 665, etc.).

The techniques using a perpendicular magnetic recording layer composed of spinel iron oxide such as maghemite are described in Japanese Patent Application Laid-Open (KOKAI) Nos. 11-110731(1999) and 11-110732(1999), etc. In order to obtain an excellent perpendicular magnetic recording layer, it is required to control a crystal orientation of a magnetic recording layer so as to preferentially orient a (400) plane of the spinel iron oxide layer in parallel with the surface of substrate by using a single-crystal substrate composed of MgO or NaCl, or providing an underlayer composed of NiO, MgO, Cr or the like, which has a thickness of 20 to 200 nm.

Also, in Japanese Patent Application Laid-Open (KOKAI) Nos. 6-168822(1994) and 11-339261(1999), it is described that a (400) plane of a maghemite thin film is oriented in parallel with the surface of a substrate, and a spacing of (400) plane of the maghemite thin film is controlled to not more than 0.2082 nm to induce a large magnetic anisotropy. More specifically, since a (200) plane of an NiO film used as an underlayer is oriented in parallel with the substrate and the spacing of the NiO film is 0.2089 nm which is larger than the inherent spacing of (400) plane of maghemite (0.2086 nm), a tensile stress is produced in the in-plane direction of the maghemite thin film, so that the spacing of (400) plane of the maghemite thin film formed on the NiO film is reduced to not more than 0.2082 nm, thereby exhibiting a large magnetostrictive anisotropy perpendicular to the film.

As to the magnetic recording media including a soft-magnetic layer formed between a substrate and a perpendicular magnetic recording layer composed of magnetic oxides such as maghemite, there are known the technique for controlling the orientation of a spinel iron oxide magnetic recording layer by forming an intermediate layer composed of non-magnetic metal such as Al between the soft-magnetic layer and the magnetic recording layer (Japanese Patent Application Laid-Open (KOKAI) No. 59-157828(1984)); the magnetic recording medium having a magnetic layer composed of iron oxide which is formed on the substrate directly or through a high-permeability magnetic thin film (Japanese Patent Application Laid-Open (KOKAI) No. 60-95721(1985)); or the technique for forming as the soft magnetic layer, a spinel iron oxide soft-magnetic thin film having the same crystal structure as that of maghemite, and further forming an underlayer for controlling the crystal orientation between the substrate and the soft-magnetic layer (Japanese Patent Application Laid-Open (KOKAI) No. 6-44550(1994), etc.).

Further, there are known techniques for producing excellent perpendicular magnetic recording media by controlling the ratio of a residual magnetization ($M_r^{//}$) obtained when magnetized in the in-plane direction to a residual magnetization ($M_r^{\perp}$) obtained when magnetized in the perpendicular direction, to a specific value (Japanese Patent Application Laid-Open (KOKAI) Nos. 59-157828(1984), 59-157829 (1984), 59-157830(1984), 59-157833(1984), 59-157838 (1984) and 60-95721(1985), etc.).

At present, it has been strongly required to provide a perpendicular magnetic recording medium comprising a maghemite thin film not only having an excellent recording resolution, a high coercive force and a high squareness but also an excellent surface smoothness which is also capable of minimizing an in-plane magnetic component in order to reduce noises due to the magnetic recording medium itself. However, the conventional perpendicular magnetic recording media have failed to satisfy these properties.

That is, in the method described in Japanese Patent Application Laid-Open (KOKAI) No. 59-157828(1984), the orientation of the spinel iron oxide magnetic recording layer is controlled by forming the intermediate layer composed of non-magnetic metal such as Al between the soft-magnetic layer and the magnetic recording layer. However, since the spacing of (200) plane of Al is narrower than that of (400) plane of the spinel iron oxide, it may be difficult to induce a large perpendicular magnetic anisotropy due to inverse magnetostrictive effect. In addition, since the intermediate layer has a thickness as large as from 10 nm to 5 μm, a magnetic spacing between the magnetic head and the soft-magnetic layer upon recording becomes large, thereby inhibiting a good magnetic interaction between the magnetic head as a main magnetic pole and the soft-magnetic backing layer as an auxiliary magnetic pole.

Also, in Japanese Patent Application Laid-Open (KOKAI) No. 60-95721(1985), it is described that a high-permeability thin film having a thickness of 0.2 to 2.0 μm and a magnetic recording layer are successively formed on a substrate. However, this KOKAI is silent about controlling the crystal orientation by forming a non-magnetic layer, etc., between the high-permeability thin film and the magnetic recording layer or between the high-permeability thin film and the substrate, and describes neither crystal orientation nor surface properties of the magnetic recording layer.

Further, in the case where the spinel iron oxide soft-magnetic layer described in Japanese Patent Application Laid-Open (KOKAI) No. 6-44550(1994) is provided, since the soft-magnetic ferrite layer having a spinel structure exhibits a large lattice constant as compared to that of spinel iron oxide used for the magnetic recording layer, a tensile stress is exerted on the magnetic recording layer, so that it is possible to induce a large perpendicular magnetic anisotropy due to inverse magnetostrictive effect. However, in order to form the spinel oxide soft-magnetic layer having an excellent soft-magnetic property, it is required to use a substrate temperature as high as about 400° C. and a heat-treating temperature as high as about 550° C. upon forming the film, thereby failing to obtain a perpendicular recording medium having an excellent surface smoothness.

Further, in Japanese Patent Application Laid-Open (KOKAI) Nos. 59-157828(1984), 59-157829(1984), 59-157830(1984), 59-157833(1984) and 59-157838(1984), etc., there is described the ratio of a residual magnetization ($M_r^{//}$) obtained when magnetized in the in-plane direction to a residual magnetization ($M_r^{\perp}$) obtained when magnetized in the perpendicular direction. However, since the ratio is not more than 2, i.e., the in-plane magnetic component is large, it may be difficult to sufficiently reduce the media noises.

In addition, in Japanese Patent Application Laid-Open (KOKAI) No. 60-95721(1985), relating to the perpendicular magnetic recording medium composed of spinel iron oxide, there are described the ratio of a residual magnetization ($M_r^{//}$) obtained when magnetized in the in-plane direction to a residual magnetization ($M_r^{\perp}$) obtained when magnetized in the perpendicular direction, and the ratio of a coercive force ($H_c^{//}$) obtained when magnetized in the in-plane direction to a coercive force ($H_c^{\perp}$) obtained when magnetized in the perpendicular direction. Although the increase of in-plane magnetic component is inhibited, the obtained perpendicular magnetic recording medium has a coercive force as low as 151 kA/m (1,900 Oe), thereby failing to provide a ultra-high density perpendicular recording medium as required.

Under the circumstances, as a result of the present inventors' earnest studies for solving the above problems, it has been found that by successively forming either a soft-magnetic layer, an NaCl-type oxide layer for orientation control and a magnetite thin film, or an NaCl-type oxide layer for orientation control and a magnetite thin film, on a substrate by a sputtering method, and then transforming the magnetite thin film into a maghemite thin film, the obtained perpendicular magnetic recording medium including the maghemite thin film can show not only an excellent recording resolution, a high coercive force and a high squareness, but also an excellent surface smoothness, and is also capable of minimizing an in-plane magnetic component in order to reduce noises due to the magnetic recording medium itself. The present invention has been attained based on the above finding.

SUMMARY OF THE INVENTION

An object of the present invention is to provide a perpendicular magnetic recording medium comprising a maghemite thin film not only having an excellent surface smoothness while maintaining a high coercive force and a high squareness, but also showing an excellent recording resolution by forming a soft-magnetic layer there underneath.

To accomplish the aim, in an first aspect of the present invention, there is provided a perpendicular magnetic recording medium, comprising:

a substrate;

a soft-magnetic layer formed on the substrate;

an NaCl-type oxide layer for orientation control formed on the soft-magnetic layer, having a thickness of from more than 0 to less than 10 nm; and a magnetic recording layer formed on the NaCl-type oxide layer for orientation control, comprising a maghemite thin film.

In a second aspect of the present invention, there is provided a perpendicular magnetic recording medium, comprising:

a substrate;

a soft-magnetic layer formed on the substrate;

an NaCl-type oxide layer for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the NaCl-type oxide layer for orientation control, comprising a maghemite thin film.

In a third aspect of the present invention, there is provided a perpendicular magnetic recording medium, comprising:

a substrate;

a soft-magnetic layer formed on the substrate, having a product ($B_s \cdot t$) of a saturation magnetic flux density ($B_s$) and a thickness (t) of the soft-magnetic layer of 1.13 to 13.57× $10^{-6}$ Wb/m (80 to 1,100 G·$\mu$m);

an NaCl-type oxide layer for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the NaCl-type oxide layer for orientation control, comprising a maghemite thin film.

In a fourth aspect of the present invention, there is provided a perpendicular magnetic recording medium, comprising:

a substrate;

a soft-magnetic layer formed on the substrate, having a product ($B_s \cdot t$) of a saturation magnetic flux density ($B_s$) and a thickness (t) of the soft-magnetic layer of 1.13 to 13.57× $10^{-6}$ Wb/m (80 to 1,100 G·$\mu$m);

an NaCl-type oxide layer for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the NaCl-type oxide layer for orientation control, comprising a maghemite thin film, and said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

In a fifth aspect of the present invention, there is provided a perpendicular magnetic recording medium, comprising:

a substrate;

an NaCl-type oxide layer for orientation control formed on the substrate, having a thickness of from more than 0 to less than 10 nm; and a magnetic recording layer formed on the NaCl-type oxide layer for orientation control, comprising a maghemite thin film, said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

In a sixth aspect of the present invention, there is provided a perpendicular magnetic recording medium, comprising:

a substrate;

a soft-magnetic layer formed on the substrate, having a product ($B_s \cdot t$) of a saturation magnetic flux density ($B_s$) and a thickness (t) of the soft-magnetic layer of 1.13 to 13.57× $10^{-6}$ Wb/m (80 to 1,100 G·$\mu$m);

an NaCl-type oxide layer for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the NaCl-type oxide layer for orientation control, comprising a maghemite thin film and having a center-line mean roughness ($R_a$) of 0.1 to 1.5 nm and a maximum height ($R_{max}$) of 1 to 15 nm, and said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^\perp$) of a residual magnetization ($M_r^{//}$) obtained when magnetized in in-plane direction to a residual magnetization ($M_r^\perp$) obtained when magnetized in perpendicular direction, of not more than 0.5; and an $H_c$ ratio ($H_c^{//}/H_c^\perp$) of a coercive force ($H_c^{//}$) obtained when magnetized in in-plane direction to a coercive force ($H_c^\perp$) obtained when magnetized in perpendicular direction, of not more than 0.5.

In a seventh aspect of the present invention, there is provided a perpendicular magnetic recording medium, comprising:

a substrate;

a soft-magnetic layer formed on the substrate, having a product ($B_s \cdot t$) of a saturation magnetic flux density ($B_s$) and a thickness (t) of the soft-magnetic layer of 1.13 to 13.57× $10^{-6}$ Wb/m (80 to 1,100 G·$\mu$m);

an NaCl-type oxide layer for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the NaCl-type oxide layer for orientation control, comprising a maghemite thin film and having a center-line mean roughness ($R_a$) of 0.1 to 1.5 nm and a maximum height ($R_{max}$) of 1 to 15 nm, and said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^\perp$) of a residual magnetization ($M_r^{//}$) obtained when magnetized in in-plane direction to a residual magnetization ($M_r^\perp$) obtained when magnetized in perpendicular direction, of not more than 0.5; an $H_c$ ratio ($H_c^{//}/H_c^\perp$) of a coercive force ($H_c^{//}$) obtained when magnetized in in-plane direction to a coercive force ($H_c^\perp$) obtained when magnetized in perpendicular direction, of not more than 0.5; and an electrical resistance of 100 to 8,000 k$\Omega$ in the case of using the soft-magnetic layer made of metal or alloy, or 100 to 30,000 M$\Omega$ in the case of using the soft-magnetic layer made of an oxide.

In an eighth aspect of the present invention, there is provided a perpendicular magnetic recording medium, comprising:

a substrate;

an NaCl-type oxide layer for orientation control formed on the substrate, having a thickness of from more than 0 to less than 10 nm and an inherent spacing of (200) plane larger than a spacing (0.2086 nm) of (400) plane of maghemite constituting the magnetic recording layer; and a magnetic recording layer formed on the NaCl-type oxide layer for orientation control, comprising a maghemite thin film and having a center-line mean roughness ($R_a$) of 0.1 to 1.5 nm and a maximum height ($R_{max}$) of 1 to 15 nm, said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^\perp$) of a residual magnetization ($M_r^{//}$) obtained when magnetized in in-plane direction to a residual magnetization ($M_r^\perp$) obtained when magnetized in perpendicular direction, of not more than 0.5; and an $H_c$ ratio ($H_c^{//}/H_c^\perp$) of a coercive force ($H_c^{//}$) obtained when magnetized in in-plane direction to a coercive force ($H_c^\perp$) obtained when magnetized in perpendicular direction, of not more than 0.5.

In a ninth aspect of the present invention, there is provided a perpendicular magnetic recording medium, comprising:

a substrate;

an NaCl-type oxide layer for orientation control formed on the substrate, having a thickness of from more than 0 to less than 10 nm and an inherent spacing of (200) plane larger than a spacing (0.2086 nm) of (400) plane of maghemite constituting the magnetic recording layer; and a magnetic recording layer formed on the NaCl-type oxide layer for orientation control, comprising a maghemite thin film and having a center-line mean roughness ($R_a$) of 0.1 to 1.5 nm and a maximum height ($R_{max}$) of 1 to 15 nm, said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^\perp$) of a residual magnetization ($M_r^{//}$) obtained when magnetized in in-plane direction to a residual magnetization ($M_r^\perp$) obtained when magnetized in perpendicular direction, of not more than 0.5; and an $H_c$ ratio ($H_c^{//}/H_c^\perp$) of a coercive force ($H_c^{//}$) obtained when magnetized in in-plane direction to a coercive force ($H_c^\perp$) obtained when magnetized in perpendicular direction, of not more than 0.5.

BRIEF DESCRIPTION OF THE DRAWINGS

FIG. 2 shows an X-ray diffraction pattern of the perpendicular magnetic recording medium obtained in Example 2.

DETAILED DESCRIPTION OF THE INVENTION

Figure 1:
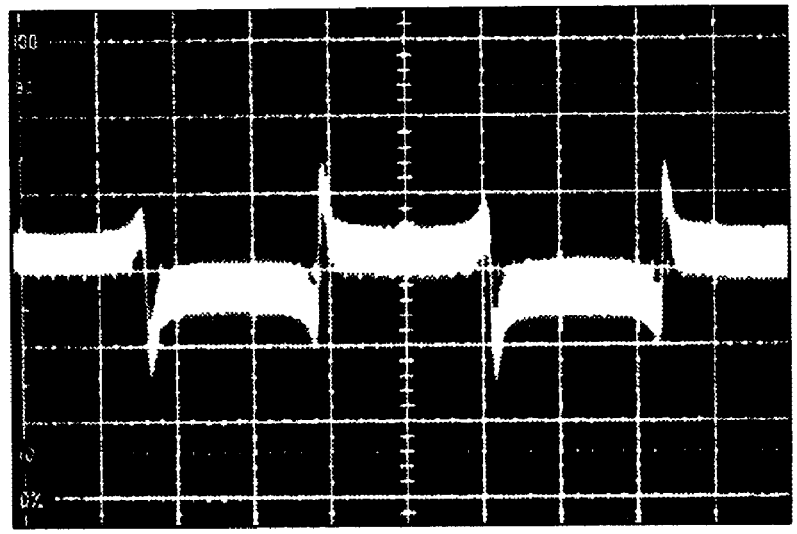
FIG. 1 shows an isolated reproduction waveform observed when recording 5 kFRPI signals on the perpendicular magnetic recording medium obtained in Example 1.

The present invention is described in detail below.

First, the perpendicular magnetic recording medium of the present invention is described.

The perpendicular magnetic recording medium according to each of the first to fourth, sixth and seventh aspects of the present invention comprises a substrate, and a soft-magnetic layer, an NaCl-type oxide layer for orientation control (an intermediate layer for control a crystal orientation of a magnetic recording layer comprising a maghemite thin film) and a magnetic recording layer successively formed on the substrate. Also, the perpendicular magnetic recording medium according to the fifth, eighth and ninth aspects of the present invention comprises a substrate, and an NaCl-type oxide layer for orientation control (an underlayer for control a crystal orientation of a magnetic recording layer comprising a maghemite thin film) and a magnetic recording layer successively formed on the substrate.

As the substrate used in the present invention, there may be used glass substrates; alloy substrate made of aluminum alloy, etc.; plastic substrates made of PET, PEN, etc.; carbon substrates; or the like. Among these substrates, the glass substrates are preferred.

Further, in the perpendicular magnetic recording medium according to the fifth, eighth and ninth aspects of the present invention, in addition to the above-described substrates, there may also be used glass substrates obtained by dispersing soft-magnetic particles in the substrates, ceramic substrates composed mainly of soft-magnetic ferrite particles, or the like. When these substrates are used for the perpendicular magnetic recording medium according to the fifth, eighth and ninth aspects of the present invention, it is possible to conduct perpendicular magnetic recording by the same system as applied to the perpendicular magnetic recording media according to the first to fourth, sixth and seventh aspects of the present invention using a single-pole magnetic head.

Next, the soft-magnetic layer is described.

In the perpendicular magnetic recording medium of the present invention, the soft-magnetic layer may be formed between the substrate and the NaCl-type oxide layer for orientation control. When such a soft-magnetic layer is formed between the substrate and the NaCl-type oxide layer for orientation control, it becomes possible to not only enhance the recording magnetic field produced by the single-pole magnetic field as a main magnetic pole, but also reduce demagnetizing field of the magnetic recording layer after recording.

In the perpendicular magnetic recording medium of the present invention, the soft-magnetic layer is not particularly restricted to specific ones since the maghemite thin film as a magnetic recording layer is well-controlled in its crystal orientation by forming such a soft-magnetic layer therein irrespective of crystal structure and crystal orientation thereof. However, the material of the soft-magnetic layer is preferably selected from those capable of providing a soft-magnetic layer having excellent surface properties and an easy-magnetization direction oriented in the track direction or radial direction of the media.

Examples of the material of the soft-magnetic layer may include Co based alloys such as Co—Zr—Nb and Co—Zr—Ta; Fe based alloys such as Fe—Si, Fe—Si—Al, Fe—B, Fe—C and Fe—Ta—N; Ni based alloys such as Ni—Fe; or the like. The soft-magnetic layer may also be composed of the soft-magnetic ferrite such as Mn—Zn ferrite. Further, there may be used a multilayer composed of either a plurality of soft-magnetic layers or a combination of the soft-magnetic layer and a non-magnetic layer made of C, Si or the like.

In the consideration of good recording and reproducing properties of the obtained perpendicular magnetic recording medium, the kind and thickness of the soft-magnetic layer may be selected such that a product ($B_s \cdot t$) of a saturation magnetic flux density ($B_s$) and a thickness (t) of the soft-magnetic layer is in the range of $1.13 \times 10^{-6}$ to $13.57 \times 10^{-6}$ Wb/m (80 to 1,100 G$\mu$m). For example, when the saturation magnetic flux density ($B_s$) of the soft-magnetic layer is 22.6 Wb/m$^2$ (18,000 G), the thickness of the soft-magnetic layer is preferably in the range of 50 to 600 nm.

The coercive force of the soft-magnetic layer is preferably not more than 796 A/m (10 Oe), more preferably not more than 557 A/m (7 Oe), still more preferably not more than 398 A/m (5 Oe). Under such a condition, the magnetic field (anisotropy field) required for the magnetic saturation against the hard magnetization direction orthogonal to the easy magnetization direction in plane, is preferably not less than 796 A/m (10 Oe), more preferably not less than 1,592 A/m (20 Oe).

The soft-magnetic layer may have any of crystalline, amorphous, nano-crystalline and granular structures as long as the product of the saturation magnetic flux density ($B_s$) and the thickness (t) of the soft-magnetic layer falls within the above-specified range. Of these structures, the amorphous, nano-crystalline and granular structures are preferred.

Further, in order to further inhibit adverse influence of spike noises caused due to formation in magnetic domain wall of the soft-magnetic layer, an underlayer such as an antiferromagnetic layer made of Mn based alloys, NiO or the like for controlling magnetic domains, and a ferromagnetic layer made of Co—Sm based alloys, Sm—Fe based alloys or the like, may be formed between the soft-magnetic layer and the substrate.

Next, the NaCl-type oxide layer for orientation control is described.

In the perpendicular magnetic recording medium of the present invention, the NaCl-type oxide layer for orientation control may be in the form of an oxide thin film having an NaCl-type structure. It is preferred that the (200) plane of the NaCl-type oxide layer for orientation control is preferentially oriented in parallel with the surface of the substrate. In particular, the NaCl-type oxide layer for orientation control is preferably an NaCl-type oxide thin film having a spacing of (200) plane larger than an inherent spacing of (400) plane of maghemite.

Examples of the NaCl-type oxide thin film may include AmO thin film, BaO thin film, CaO thin film, CdO thin film, CeO thin film, CoO thin film, EuO thin film, FeO thin film, MgO thin film, MnO thin film, NdO thin film, NiO thin film, NpO thin film, SmO thin film, SrO thin film, TiO thin film, VO thin film, YbO thin film or the like. Of these thin films, MgO thin film, NiO thin film, CoO thin film, MnO thin film or the like are preferred.

The thickness of the NaCl-type oxide layer for orientation control is usually from more than 0 nm to less than 10 nm, preferably 1 to 9 nm, more preferably 1 to 8 nm, still more preferably 1 to 5 nm. When no NaCl-type oxide layer for orientation control is provided or the thickness of the NaCl-type oxide layer for orientation control is not less than 10 nm, the magnetic recording layer may be deteriorated in crystal orientation. When such an NaCl-type oxide layer for orientation control composed of an NaCl-type oxide which has a thickness of not less than 10 nm is formed on the soft-magnetic layer, the magnetic spacing between the magnetic head and the soft-magnetic layer becomes large. As a result, when forming magnetic recording media having a high-recording density, a good magnetic interaction between the magnetic head as a main magnetic pole and the soft-magnetic layer (backing layer) as an auxiliary magnetic pole cannot be sufficiently exhibited.

Next, the magnetic recording layer is described.

The maghemite thin film constituting the magnetic recording layer is represented by the general formula: $\gamma\text{-Fe}_2\text{O}_3$, and may contain a small amount (preferably not more than 20 atomic %) of $Fe^{2+}$.

Further, the maghemite thin film may also contain cobalt in order to enhance a coercive force thereof. The cobalt content in the maghemite thin film is preferably not more than 20% by weight, more preferably 1 to 10% by weight based on Fe. When the cobalt content is more than 20% by weight, it may be difficult to obtain a perpendicular magnetic recording medium having an excellent stability independent of the passage of time.

Meanwhile, the maghemite thin film may also contain, in addition to cobalt, if required, at least one element selected from the group consisting of B, C, Cr, Cu, Mn, Ni, Ti and Zn which can be ordinarily used for improving various properties thereof, at a molar ratio of the element to Fe of preferably not more than 0.04, more preferably about 0.005 to 0.04. When the above different kinds of elements are incorporated in the maghemite thin film, it becomes possible to readily obtain a perpendicular magnetic recording medium having a higher coercive force and a higher squareness.

The thickness of the magnetic recording layer constituted by the maghemite thin film is preferably 5 to 80 nm, more preferably 5 to 50 nm. When the thickness of the magnetic recording layer is less than 5 nm, it may be difficult to readily obtain a perpendicular magnetic recording medium having a high coercive force and a high squareness. When the thickness of the magnetic recording layer is more than 80 nm, the magnetic recording layer may be deteriorated in surface properties and may suffer from large media noises.

The magnetic recording layer constituted by the maghemite thin film has a coercive force value as measured in the perpendicular direction, of preferably not less than 159 kA/m (2,000 Oe), more preferably 199 to 1,194 kA/m (2,500 to 15,000 Oe); and a saturation magnetization value (value of magnetization when applying a magnetic field of 1,590 kA/m (20 kOe) thereto) of preferably 29 to 53 Wb/m$^3$ (230 to 420 emu/cm$^3$), more preferably 30 to 53 Wb/m$^3$ (240 to 420 emu/cm$^3$).

When the magnetic recording layer constituted by the maghemite thin film is magnetized in the perpendicular direction, the squareness ($M_r/M_s$) obtained without compensation of demagnetizing field is preferably not less than 0.7, more preferably not less than 0.75. The upper limit of the squareness ($M_r/M_s$) is 1.0. When the squareness ($M_r/M_s$) is less than 0.7, large media noises may be caused, thereby failing to obtain a suitable perpendicular magnetic recording medium.

The magnetic recording layer constituted by the maghemite thin film has a ratio (Mr ratio: $M_r^{//}/M_r^{\perp}$) of a residual magnetization ($M_r^{//}$) obtained when magnetized in the in-plane direction to a residual magnetization ($M_r^{\perp}$) obtained when magnetized in the perpendicular direction of preferably not more than 0.5; and a ratio ($H_c$ ratio: $H_c^{//}/H_c^{\perp}$) of a coercive force ($H_c^{//}$) obtained when magnetized in the in-plane direction to a coercive force ($H_c^{\perp}$) obtained when magnetized in the perpendicular direction of preferably not more than 0.5. When the $M_r$ ratio or the $H_c$ ratio is more than 0.5, large media noises may be caused, thereby failing to obtain a suitable perpendicular magnetic recording medium.

Among various parameters of the surface roughness of the magnetic recording layer constituted by the maghemite thin film, the center-line mean roughness ($R_a$) thereof is preferably 0.1 to 1.5 nm, more preferably 0.1 to 1.0 nm. When the center-line mean roughness ($R_a$) is more than 1.5 nm, it may be difficult to obtain the aimed effects of the present invention. Also, the maximum height ($R_{max}$) of the magnetic recording layer is preferably 1 to 15 nm, more preferably 1 to 12 nm. When the maximum height ($R_{max}$) is more than 15 nm, it may be difficult to obtain the aimed effects of the present invention.

The perpendicular magnetic recording medium having a soft-magnetic layer composed of metal or alloy according to the present invention has an electrical resistance value of preferably 100 to 10,000 k$\Omega$, more preferably 100 to 8,000 k$\Omega$, still more preferably 100 to 7,800 k$\Omega$. The perpendicular magnetic recording medium having a soft-magnetic layer composed of oxides according to the present invention has an electrical resistance value of preferably 50 to 30,000 M$\Omega$, more preferably 500 to 20,000 M$\Omega$. The perpendicular magnetic recording medium having no soft-magnetic layer according to the present invention has an electrical resistance value of preferably 50 to 30,000 M$\Omega$. When the electrical resistance value is less than the above-specified lower limit, it is expected that a large amount of magnetite may still remain in the maghemite thin film, resulting in poor properties of the obtained perpendicular magnetic recording medium.

Next, the process for producing the perpendicular magnetic recording medium according to the present invention is described.

The perpendicular magnetic recording medium according to each of the first to fourth, sixth and seventh aspects of the present invention can be produced by first successively forming a soft-magnetic layer, an NaCl-type oxide layer for orientation control and a magnetite thin film on a substrate; and then transforming the magnetite thin film into a maghemite thin film. The perpendicular magnetic recording medium according to the fifth, eight and ninth aspects of the present invention can be produced by first successively forming an NaCl-type oxide layer for orientation control and a magnetite thin film on a substrate; and then transforming the magnetite thin film into a maghemite thin film.

For example, the perpendicular magnetic recording medium according to each of the first to fourth, sixth and seventh aspects of the present invention can be produced by any of the following methods:

(a) A method of successively forming a soft-magnetic layer, an NaCl-type oxide layer for orientation control and a magnetite thin film on a substrate by a sputtering method, and then heat-treating the magnetite thin film in atmospheric air at a temperature of 200 to 350° C. to transform the magnetite thin film into a maghemite thin film;

(b) a method of successively forming a soft-magnetic layer, an NaCl-type oxide layer for orientation control and a magnetite thin film on a substrate by a sputtering method, and then continuously heat-treating the magnetite thin film in an oxygen-containing atmosphere in the same sputtering chamber without taking out into atmospheric air to transform the magnetite thin film into a maghemite thin film;

(c) a method of successively forming a soft-magnetic layer, an NaCl-type oxide layer for orientation control and a magnetite thin film on a substrate by a sputtering method, and then continuously subjecting the magnetite thin film to sputtering treatment under an oxygen-rich atmosphere in the same sputtering chamber without taking out into atmospheric air to transform the magnetite thin film into a maghemite thin film;

(d) a method of successively forming a soft-magnetic layer and an NaCl-type oxide layer for orientation control on a substrate by a sputtering method, sputtering an Fe, an Fe alloy or an iron oxide target in an oxygen-rich atmosphere to deposit an ultra-thin iron oxide layer, forming a magnetite thin film, and then transforming the magnetite thin film into a maghemite thin film by the same method as used in any one of the above-described methods (a) to (c);

(e) a method of first successively forming a soft-magnetic layer, an NaCl-type oxide layer for orientation control and a magnetite thin film on a substrate by a sputtering method, and then subjecting the magnetite thin film to oxidation treatment in a plasma-activated oxygen atmosphere containing a rare gas to transform the magnetite thin film into a maghemite thin film; and (f) a method of first successively forming a soft-magnetic layer and an NaCl-type oxide layer for orientation control on a substrate by a sputtering method, and then sputtering a metal or alloy target under a plasma atmosphere activated by an electron cyclotron resonance (ECR) microwave to form a maghemite thin film.

Meanwhile, the perpendicular magnetic recording medium according to the fifth, eighth and ninth aspects of the present invention can be produced by the any method of the above-described methods (a) to (f) except that no soft-magnetic layer is formed therein.

The sputtering apparatus usable in the present invention is not particularly restricted, and may be any of generally used sputtering apparatuses including known sputtering apparatuses comprising a target, a substrate holder, a vacuum chamber, etc., for example, "C-3102" (manufactured by ANELBA CO., LTD.), "SH-250H-T06" (manufactured by NIHON SHINKU GIJUTSU CO., LTD.) or the like.

The above methods (a) to (c) may be similarly conducted up to production of the magnetite thin film.

In the case of forming the metal or alloy based soft-magnetic layer or the soft-magnetic layer having a granular structure, a metal target, an alloy target, a target composed of a mixture of metal target and an oxide, a target composed of a non-magnetic material and a magnetic material or the like is sputtered in a rare gas by an ordinary method to deposit the sputtered substance on a substrate. Meanwhile, as the rare gas, there may be used at least one gas selected from the group consisting of Ar, Kr and Xe. Further, the rare gas may contain a slight amount of a nitrogen gas in order to improve the soft magnetic property.

The oxide based soft-magnetic layer may be produced by sputtering a sintered oxide target in a rare gas or in a mixed atmosphere composed of a rare gas and an oxygen gas to deposit the sputtered substance on a substrate; or by subjecting an alloy target to reactive sputtering in a mixed atmosphere composed of a rare gas and an oxygen gas to deposit the sputtered substance on a substrate.

Also, the soft-magnetic layer may be in the form of a multiple film combined with a non-magnetic layer or other soft-magnetic layer.

The NaCl-type oxide layer for orientation control may be produced by subjecting a metal or alloy target to reactive sputtering in a mixed atmosphere composed of a rare gas and an oxygen gas, or sputtering the metal or alloy target in an oxygen-rich atmosphere, to deposit the sputtered substance on the previously formed soft-magnetic layer or the substrate. Alternatively, the NaCl-type oxide layer for orientation control may be produced by sputtering a sintered target composed of oxides such as MgO, NiO, CoO and MnO in a rare gas or in a mixed atmosphere composed of a rare gas and an oxygen gas to deposit the sputtered substance on the soft-magnetic layer or the substrate.

The oxygen-rich atmosphere used upon the sputtering for production of the NaCl-type oxide layer for orientation control, means an atmosphere having an oxygen partial pressure of such a range in which the surface of the metal or alloy target is oxidized, and the deposition rate of the oxide layer is considerably decreased. At this time, the cathode current value is considerably increased as compared to that of the condition where the surface of the target is not oxidized, whereas the voltage value is considerably decreased. In general, under such a condition that the surface of the metal or alloy target is oxidized, an oxide coating film is formed on the surface of the target, so that it may be difficult to deposit an oxide thin film by a reactive sputtering method. On the contrary, in the present invention, by conducting the sputtering in such an oxygen-rich atmosphere, it is considered that oxides or oxide ions are driven out from the target. In the case of some kinds of NaCl-type oxide thin films, when the NaCl-type oxide layer for orientation control is formed by sputtering under an oxygen-rich atmosphere, the maghemite thin film formed on the NaCl-type oxide layer for orientation control may sometimes exhibit a more stable and more excellent crystal orientation as compared to the case where the NaCl-type oxide layer for orientation control is produced by ordinary reactive sputtering method.

The magnetite thin film can be formed on the NaCl-type oxide layer for orientation control by sputtering an Fe metal or Fe alloy target while introducing a mixed gas composed of oxygen and a rare gas, and controlling an oxygen flow rate (CCM) in the mixed gas as well as a magnetite deposition rate (nm/sec). Alternatively, a sintered target composed of oxides such as $Fe_2O_3$ is subjected to reactive sputtering, or sputtered while introducing only a rare gas, to deposit the magnetite thin film on the NaCl-type oxide layer for orientation control. From the industrial viewpoint, it is preferred that the magnetite thin is formed by the reactive sputtering method using the metal or alloy target.

The oxygen flow rate (CCM) in the mixed gas required for achieving a suitable magnetite deposition rate (nm/sec) varies depending upon various conditions used for obtaining the magnetite thin film by sputtering the Fe metal or Fe alloy target, for example, kind and structure of sputtering apparatus used, deposition rate, total gas pressure, substrate temperature, surface area of sputtering target, etc. These conditions may be appropriately selected.

In the above method (a), after forming the magnetite thin film, the obtained magnetite thin film is taken out into atmospheric air, and then heat-treated in air at a temperature of 200 to 350° C. for 0.5 to 2 hours.

The oxygen-rich atmosphere used upon forming the maghemite thin film in the above method (c) means an atmosphere having an oxygen partial pressure of such a range that the surface of the Fe metal or Fe alloy target is oxidized and the deposition rate of the magnetite is considerably decreased. At this time, the cathode current value is considerably increased as compared to that of the condition where the surface of the target is not oxidized, whereas the voltage value is considerably decreased. In general, under such a condition that the surface of the Fe metal or Fe alloy target is oxidized, an iron oxide film is formed on the surface of the target, so that it may be difficult to deposit magnetite by a reactive sputtering method. On the contrary, in the present invention, by conducting the sputtering in such an oxygen-rich atmosphere, it is considered that iron oxide or iron ions are driven out from the target. As the target, a sintered target of oxides may also be used in addition to the metal or alloy target. Meanwhile, in the case of using the sintered target of oxides, the below-mentioned relational formula between the oxygen flow rate and the magnetite deposition rate will be, as a matter of course, varied.

More specifically, the oxygen-rich atmosphere in a sputtering film-forming apparatus used in the present invention, means an atmosphere satisfying the condition represented by the formula:

$$F(O_2)/R \geq 12$$

wherein $F(O_2)$ is an oxygen flow rate (CCM) in oxidation treatment; and R is a magnetite deposition rate (nm/sec).

For example, in the case of R=2.0 (nm/sec), the oxygen flow rate ($F(O_2)$) capable of oxidizing the target is not less than 24 (CCM); and in the case of R=1.0 (nm/sec), the oxygen flow rate ($F(O_2)$) capable of oxidizing the target is not less than 12 (CCM).

In the above method (c), the sputtering treatment in an oxygen-rich atmosphere upon deposition of the magnetite thin film is conducted at a substrate temperature of usually 30 to 250° C., preferably 80 to 150° C. When the substrate temperature is out of the above-specified range, it may be difficult to sufficiently attain effects of the present invention.

In the above method (c), the sputtering time in an oxygen-rich atmosphere is preferably 1 to 30 seconds, more preferably 1 to 10 seconds. When the sputtering time is less than 1 second, it may be difficult to sufficiently attain effects of the present invention. When the sputtering time is more than 30 seconds, the obtained thin film may tend to be deteriorated in magnetic properties.

The oxygen-rich atmosphere used in the sputtering for forming the ultra-thin iron oxide layer in the above method (d), means an atmosphere having an oxygen partial pressure of such a range in which the surface of the Fe metal or Fe alloy target is oxidized, and the deposition rate of the oxide is considerably decreased. At this time, the cathode current value is considerably increased as compared to that of the condition where the surface of the target is not oxidized, whereas the voltage value is considerably decreased. In general, under such a condition that the surface of the Fe metal or Fe alloy target is oxidized, an iron oxide film is formed on the surface of the target, so that it may be difficult to deposit an oxide thin film by a reactive sputtering method. On the contrary, in the present invention, by conducting the sputtering in such an oxygen-rich atmosphere, it is considered that iron oxide or iron oxide ions are driven out from the target. By forming a magnetite thin film from an initial layer previously sputtered in an oxygen-rich atmosphere and then transforming the magnetite thin film into a maghemite thin film, it is possible to stably obtain the maghemite thin film having an excellent grain size distribution.

The point of the present invention is that a magnetic recording layer constituted by a maghemite thin film can be well controlled in its crystal orientation by forming an NaCl-type oxide layer for orientation control composed of an NaCl-type oxide thin film having a specific small thickness underneath the magnetic recording layer, thereby providing a perpendicular magnetic recording medium having excellent surface properties and magnetic properties.

The reason why the perpendicular magnetic recording medium having excellent magnetic properties can be produced by forming the magnetic recording layer on the NaCl-type oxide layer for orientation control, is considered as follows. That is, it is considered that by forming the NaCl-type oxide layer for orientation control constituted by the NaCl-type oxide thin film having a (200) plane spacing larger than a inherent spacing of (400) plane of maghemite, a tensile stress is generated in the in-plane direction of the maghemite thin film formed on the NaCl-type oxide layer for orientation control, so that a large perpendicular magnetic anisotropy can be induced therein. Further, it is considered that by controlling the thickness of the NaCl-type oxide layer for orientation control to the specific smaller value, the magnetic properties of the perpendicular magnetic recording medium can be enhanced by a synergistic effect of the specific smaller thickness of the NaCl-type oxide layer for orientation control and the improved crystal orientation of the magnetic recording layer.

The conventional NaCl-type oxide layer for orientation control formed underneath the magnetic recording layer has a thickness of 100 to 200 nm in order to improve magnetic properties of the magnetic recording layer. However, such a large thickness of the NaCl-type oxide layer for orientation control causes the deterioration of surface properties. On the contrary, in the present invention, even though the thickness of the NaCl-type oxide layer for orientation control is smaller than that of the conventional NaCl-type oxide layer for orientation control, since the NaCl-type oxide thin film capable of exhibiting an excellent function as the NaCl-type oxide layer for orientation control is used therefor, it is possible to obtain a perpendicular magnetic recording medium having improved surface properties as well as magnetic properties identical to or higher than those of the conventional ones.

In addition, the reasons why the perpendicular magnetic recording medium according to each of the first to fourth, sixth and seventh aspects of the present invention can exhibit an excellent reproduction property, are described below.

Conventionally, in order to produce a maghemite thin film as a perpendicular magnetic recording layer, it has been required to control crystal orientation of maghemite by forming a magnetite thin film on a spinel iron oxide soft-magnetic thin film having the same crystal structure as that of the magnetite thin film. However, since a substrate temperature or treating temperature as high as 400 to 550° C. is required in order to form the spinel iron oxide soft-magnetic thin film composed of Mn—Zn ferrite or the like, there arise problems such as deteriorated surface properties. On the contrary, in the present invention, the maghemite thin film as a magnetic recording layer can be well controlled in its crystal orientation by forming the NaCl-type oxide layer for orientation control underneath the magnetic recording layer, thereby inducing a large perpendicular magnetic anisotropy in the magnetic recording layer. For this reason, the soft-magnetic layer having excellent surface properties can be selected without any limitations to kinds, crystallinity and crystal structure thereof.

Further, although the surface properties of the magnetic recording layer varies depending upon those of the NaCl-type oxide layer for orientation control, soft-magnetic layer and substrate, since the thickness of the NaCl-type oxide layer for orientation control is as small as less than 10 nm, it is possible to produce a perpendicular magnetic recording medium having excellent surface properties without any damage to the magnetic effect of the soft-magnetic layer. In addition, since the magnetic recording layer has an excellent crystal orientation, the obtained perpendicular magnetic recording medium can be improved in magnetic properties such as squareness.

In the perpendicular magnetic recording medium of the present invention, since the NaCl-type oxide layer for orientation control is as thin as less than 10 nm, a magnetic spacing between the magnetic head and the soft-magnetic layer upon recording can be minimized. As a result, since the soft-magnetic layer satisfactorily functions as a backing layer, a magnetic interaction between the magnetic head as a main magnetic pole and the soft-magnetic backing layer as an auxiliary magnetic pole can be sufficiently exhibited even in perpendicular magnetic recording media having a ultra-high recording density.

Figure 4:
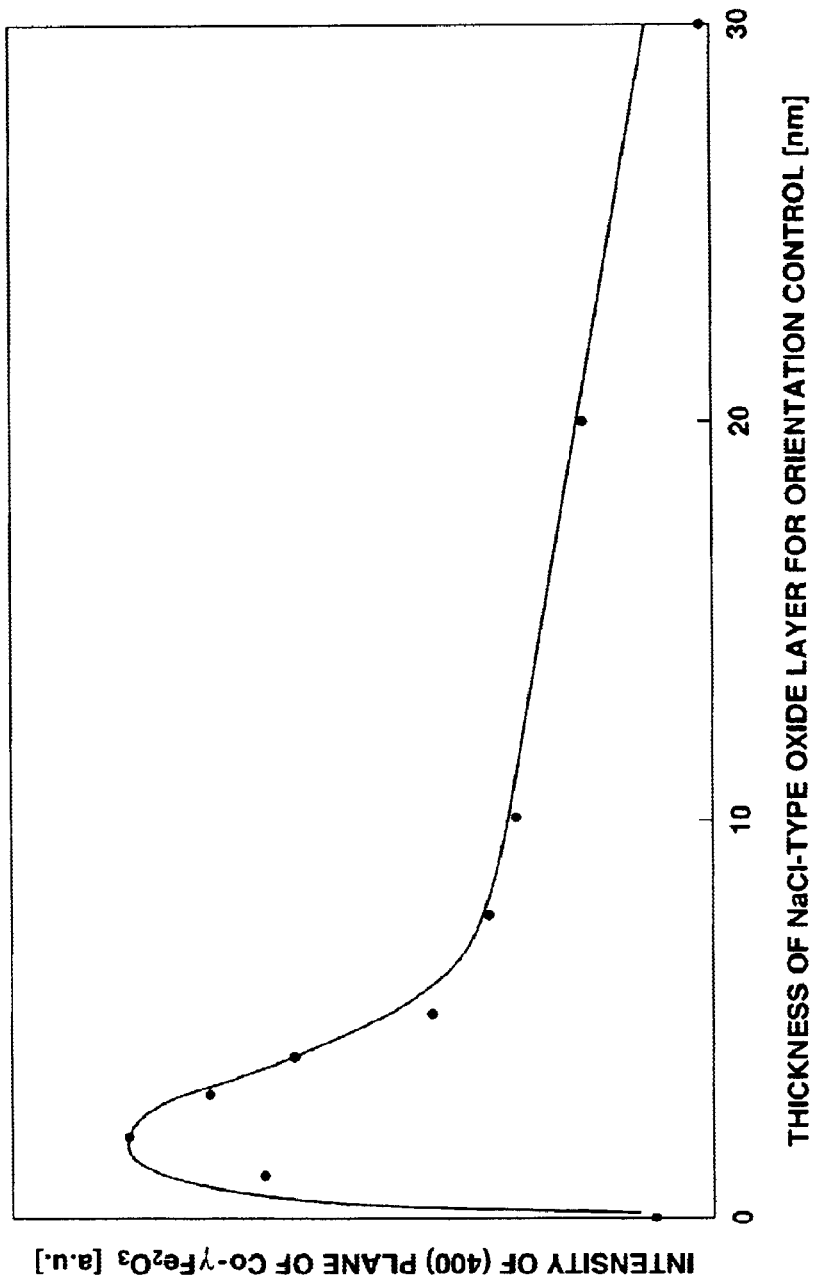
FIG. 4 is a graph showing the relationship between a thickness (nm) of an NaCl-type oxide layer for orientation control and a diffraction intensity of (400) plane of a maghemite thin film in the perpendicular magnetic recording medium according to the present invention.
Figure 5:
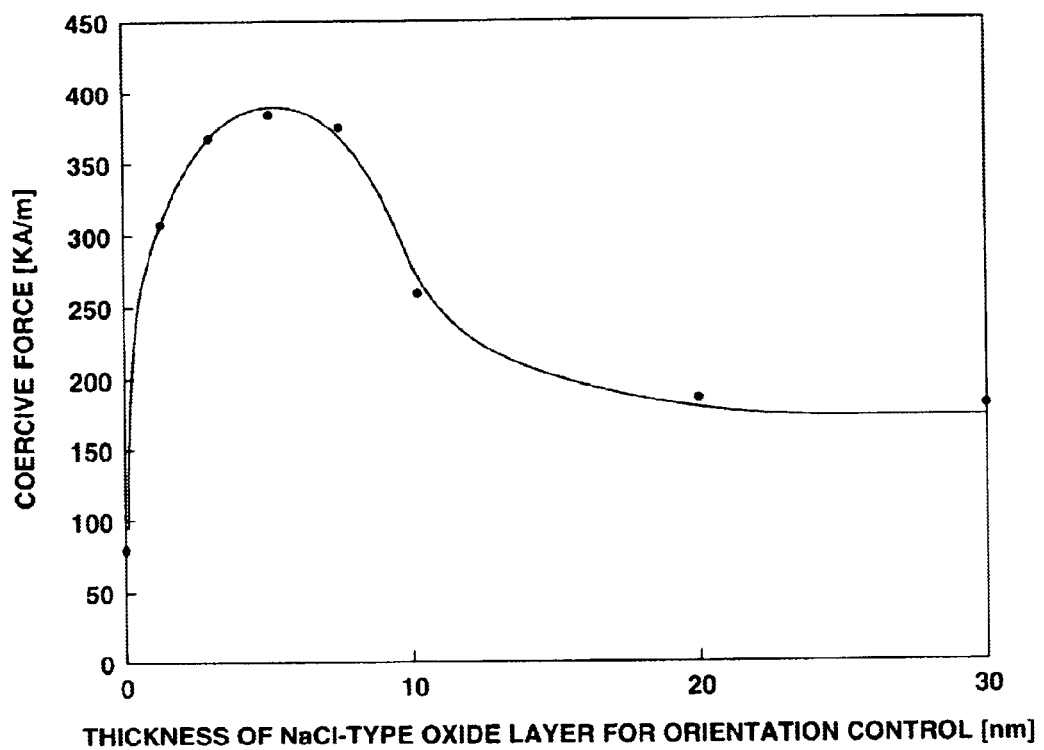
FIG. 5 is a graph showing the relationship between a coercive force of the perpendicular magnetic recording medium according to the present invention, and a thickness (nm) of an NaCl-type oxide layer for orientation control formed.
Figure 6:
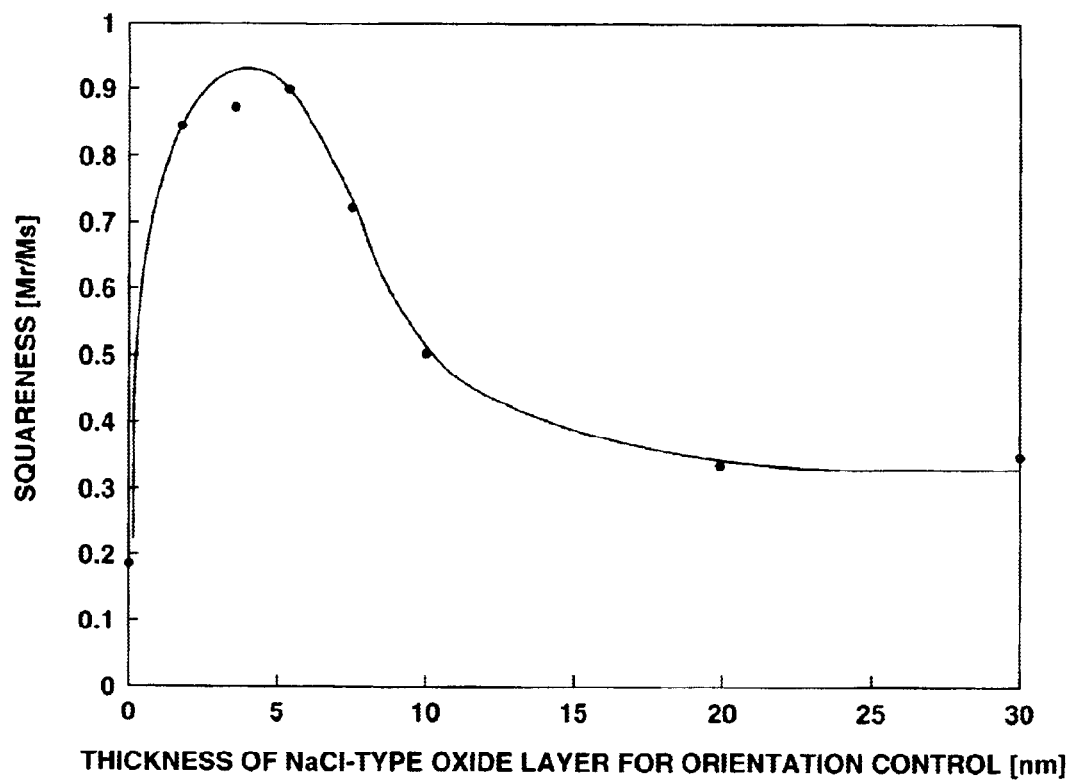
FIG. 6 is a graph showing the relationship between a squareness ($M_r/M_s$) obtained without compensation of demagnetizing field of the perpendicular magnetic recording medium according to the present invention, and a thickness (nm) of an NaCl-type oxide layer for orientation control formed.

FIG. 4 shows the relationship between a thickness (nm) of the NaCl-type oxide layer for orientation control (MgO) and a diffraction intensity of (400) plane of the maghemite thin film; FIG. 5 shows the relationship between a coercive force of the perpendicular magnetic recording medium and a thickness (nm) of the NaCl-type oxide layer for orientation control (MgO) formed therein; and FIG. 6 shows the relationship between and a thickness (nm) of the NaCl-type oxide layer for orientation control (MgO) and a squareness ($M_r/M_s$) of the maghemite thin film. As recognized from any of FIGS. 4 to 6, when the MgO thin film as the NaCl-type oxide layer for orientation control has a thickness of less than 10 nm, the obtained perpendicular magnetic recording medium can exhibit excellent properties.

Also, in the above production method (c), since the sputtering treatment in an oxygen-rich atmosphere can be conducted a temperature as low as not more than 150° C., plastic substrates composed of PET, PEN or the like which have not been used in the conventional production methods, can be used therein. In addition, it is possible to effectively prevent excessive growth of magnetic particles and deterioration of magnetic properties due to migration from the substrate or the like. Further, conventionally, when the heat treatment is conducted in atmospheric air, several hours are required for temperature rise and cooling. Whereas, in the present invention, since no heat treatment in atmospheric air is required, the time required for preparing the maghemite thin film can be considerably shortened.

Thus, the perpendicular magnetic recording medium having the soft-magnetic layer according to the present invention are excellent in surface smoothness and magnetic properties, and shows an excellent crystal orientation, so that a magnetic spacing between the magnetic layer and the magnetic head or between the soft-magnetic backing layer and the magnetic head can be minimized. Further, the perpendicular magnetic recording medium exhibits an improved recording resolution and, therefore, is suitable as an ultra-high density recording perpendicular magnetic recording medium.

Furthermore, the perpendicular magnetic recording medium having no soft-magnetic layer according to the present invention can also show excellent surface smoothness and magnetic properties and, therefore, is suitable as a ultra-high density recording perpendicular magnetic recording medium.

EXAMPLES

The present invention is described in more detail by Examples and Comparative Examples, but the Examples are only illustrative and, therefore, not intended to limit the scope of the present invention.

Various properties were evaluated by the following methods.

(1) The thickness of each of the magnetite thin film, the maghemite thin film as a magnetic recording layer, the soft-magnetic layer and the NaCl-type oxide layer for orientation control was measured as follows. That is, before deposition of the thin film, a line was drawn with a resist pen on a substrate. Then, after deposition of the thin film on the substrate, the drawn line and the film portion deposited thereon were simultaneously removed using an organic solvent. The thus formed stepped portion was measured by a tracer-type surface roughness tester ("DEKTAK 3ST" manufactured by VEECO CO., LTD.) or an atomic force microscope (manufactured by DIGITAL INSTRUMENTS (D.I.)). The thickness of the thin film was calculated from the measured value.

(2) The oxidation (transformation) of the magnetite thin film into the maghemite thin film was determined and evaluated by measuring the change in surface electrical resistance as one of indices therefor.

That is, in the case where an alloy based soft-magnetic thin film is formed, the surface electrical resistance of the magnetite thin film is 0.01 to 100 kΩ, and the surface electrical resistance of the maghemite thin film is increased to from more than 100 kΩ to 5,000 kΩ. The surface electrical resistance of the respective thin films was measured by an Insulation Tester DM-1527 (manufactured by SANWA DENKI KEIKI CO., LTD.) by setting the distance between two probes to 10 mm.

(3) The X-ray diffraction pattern of the respective thin film was expressed by the value measured by an X-ray diffractometer "RINT2500" (manufactured by RIGAKU DENKI CO., LTD.).

The measuring conditions were as follows:

Target used: Cu; tube voltage: 40 kV; tube current: 300 mA; vertical goniometer; sampling width: 0.010°; emitting slit: 1.0°; scattering slit: 1.0°; light-receiving slit: 0.15 mm; diffraction angle range (2θ) measured: 20.00° to 80.00°

(4) The surface roughness values (center-line mean roughness ($R_a$) and maximum height ($R_{max}$)) of the magnetite thin film and the maghemite thin film were measured using an atomic force microscope (manufactured by DIGITAL INSTRUMENTS (D.I.)) with respect to a 5 μm-square area of the surface thereof. In addition, the grain size of grains present on the surface of the maghemite thin film was measured using the above atomic force microscope (manufactured by DIGITAL INSTRUMENTS (D.I.)) with respect to a 500 nm-square area of the surface thereof.

(5) The magnetic properties such as coercive force, squareness, etc. of the perpendicular magnetic recording medium having a soft-magnetic layer according to the present invention, were measured using "Kerr-Effect Measuring Equipment BH-M800-FK" (manufactured by NEOARC CO., LTD.). The magnetic properties were measured by applying a maximum magnetic field of 1,113 kA/m (14 kOe) in the direction perpendicular to the surface of the magnetic layer, and evaluated without compensation of demagnetizing field.

(6) The maqnetic properties of the perpendicular magnetic recording medium having no soft-magnetic layer, were measured using "Vibrating Sample Magnetometer VSM SSM-5-15" (manufactured by TOEI KOGYO CO., LTD.). The magnetic properties were measured by applying a maximum magnetic field of 1,590 kA/m (20 kOe) in the direction perpendicular or parallel to the surface of the magnetic layer, and evaluated without compensation of demagnetizing field.

Meanwhile, the magnetic properties ($M_r$ ratio: $M_r^{//}/M_r^{\perp}$; $H_c$ ratio: $H_c^{//}/H_c^{\perp}$) of the perpendicular magnetic recording medium having the soft-magnetic layer could not be directly measured. Therefore, the perpendicular magnetic recording medium was produced under the same conditions as described above except that no soft-magnetic layer was formed therein, and the magnetic properties thereof were measured and evaluated using "Vibrating Sample Magnetometer VSM SSM-5-15" (manufactured by TOEI KOGYO CO., LTD.).

Also, the magnetic properties of the soft-magnetic layer were measured and evaluated using "Vibrating Sample Magnetometer VSM SSM-5-15" by applying a maximum magnetic field of 39.75 kA/m (500 Oe) in the direction parallel to the surface thereof, or using "Kerr-Effect Measuring Equipment BH-430GHL-2" (manufactured by NEOARC CO., LTD.) by applying a maximum magnetic field of 1,988 A/m (25 Oe) in the direction parallel to the surface thereof.

Example 1
<Production of Perpendicular Magnetic Recording Medium According to Fifth Aspect of the Present Invention>
NaCl-Type Oxide Layer for Orientation Control By using an in-line disk sputtering apparatus "C-3102" (manufactured by ANELBA CO., LTD.) and setting a distance between a glass substrate and an MgO sintered target to 85 mm, the sintered target was sputtered at ordinary temperature (about 20° C.) in an argon atmosphere having a total pressure of 0.094 Pa, thereby forming an MgO thin film having a thickness of 5 nm at a deposition rate of 0.03 nm/sec on the glass substrate.
Magnetite Film Then, a metal alloy (Fe+3 wt. % Co) target was sputtered on the obtained MgO thin film at 150° C. in an atmosphere containing oxygen and argon and having an oxygen flow rate of 20 CCM, an oxygen partial pressure of 0.03 Pa and a total pressure of 0.38 Pa, thereby forming a Co-containing magnetite thin film having a thickness of 20 nm at a deposition rate of 2 nm/sec on the MgO thin film.
Oxidation in Atmospheric Air The thus obtained thin film was heat-treated in an electric furnace in atmospheric air at 300° C. for one hour, thereby forming a Co-containing maghemite thin film.

The thus obtained Co-containing maghemite thin film had a thickness of 20 nm. As to the surface roughness of the Co-containing maghemite thin film, the center-line mean roughness ($R_a$) thereof was 0.6 nm; and the maximum height ($R_{max}$) thereof was 8.1 nm. In addition, the obtained maghemite had an average grain size of 18 nm, and the magnetic recording layer composed of maghemite exhibited a coercive force of 314 kA/m (3,945 Oe), and a squareness ($M_r/M_s$) of 0.83, and a surface electrical resistance of 9,600 MΩ.

Further, it was confirmed that the maghemite thin film had an $M_r$ ratio ($M_r^{//}/M_r^{\perp}$) of 0.39; and an $H_c$ ratio ($H_c^{//}/H_c^{\perp}$) of 0.36. Meanwhile, since the (200) plane spacing of the obtained MgO thin film was about 0.2107 nm and, therefore, larger than the (400) plane spacing inherent to maghemite (0.2086 nm), it was considered that a large perpendicular magnetic anisotropy was induced in the maghemite thin film.

After the surface of the obtained medium was coated with a perfluoropolyether based lubricant "FOMBLIN Z DOL" (tradename, manufactured by Ausimont Co., Ltd.), the medium was subjected to evaluation of recording and reproducing properties thereof using an MR head having a specification including a write pole width of 1.9 µm, a shield gap of 0.21 µm, a read track width of 1.5 µm and a head flying height of 35 nm as well as a spin stand "LS-90" (manufactured by Kyodo Denshi System Co., Ltd.) at a linear speed of 11.43 m/s and a sense current of 10 $mA_{DC}$. The obtained reproduction waveforms are shown in FIG. 1. As shown in FIG. 1, the reproduction waveforms had a high dipulse ratio.

Example 2
<Production of Perpendicular Magnetic Recording Media According to First Aspect of the Present Invention>
Soft-Magnetic Layer By using an in-line disk sputtering apparatus "C-3102" (manufactured by ANELBA CO., LTD.) and setting a distance between a glass substrate and a metal alloy target to 85 mm, the metal alloy target (Co—Zn—Nb) was sputtered at ordinary temperature (about 20° C.) in an argon atmosphere having a total pressure of 0.67 Pa, thereby forming a Co—Zn—Nb thin film having a thickness of 400 nm at a deposition rate of 1.4 nm/sec on the glass substrate.

The thus obtained Co—Zn—Nb soft-magnetic layer was amorphous, and had a coercive force of about 79.5 A/m (1 Oe) and an easy magnetization direction extending in the radial direction thereof. Meanwhile, it was confirmed that the applied magnetic field required for magnetic saturation in the track direction as the hard-magnetization direction was about 1.193 A/m (15 Oe), and the product of saturation magnetization and thickness of the soft-magnetic layer was 7.04×10$^{-6}$ Wb/m (5,600 Gµm).
MgO NaCl-Type Oxide Layer for Orientation Control Successively, an MgO sintered target was sputtered on the obtained Co—Zn—Nb thin film in an argon atmosphere having a total pressure of 0.094 Pa, thereby forming an MgO thin film having a thickness of 5 nm at a deposition rate of 0.03 nm/sec on the Co—Zn—Nb thin film.
Magnetite Film Then, a metal alloy (Fe+3 wt. % Co) target was sputtered on the obtained MgO thin film at 150° C. in an atmosphere containing oxygen and argon and having an oxygen flow rate of 20 CCM, an oxygen partial pressure of 0.03 Pa and a total pressure of 0.38 Pa, thereby forming a Co-containing magnetite thin film having a thickness of 20 nm at a deposition rate of 2 nm/sec on the MgO thin film.
Oxidation in Atmospheric Air The thus obtained multi-layered film was heat-treated in an electric furnace in atmospheric air at 300° C. for one hour, thereby forming a Co-containing maghemite thin film.

The thus obtained Co-containing maghemite thin film had a thickness of 20 nm. As to the surface roughness of the Co-containing maghemite thin film, the center-line mean roughness ($R_a$) thereof was 0.7 nm; and the maximum height ($R_{max}$) thereof was 10.0 nm. In addition, the obtained maghemite had an average grain size of 18 nm, and the magnetic recording layer composed of maghemite exhibited a coercive force of 358 kA/m (4,500 Oe), and a squareness ($M_r/M_s$) of 0.82, and a surface electrical resistance of 5,100 kΩ. Meanwhile, since the (200) plane spacing of the obtained MgO thin film was about 0.2107 nm and, therefore, larger than the (400) plane spacing inherent to maghemite (0.2086 nm), it was considered that a large perpendicular magnetic anisotropy was induced in the maghemite thin film.

Further, it was confirmed that the obtained perpendicular magnetic recording medium having no soft-magnetic layer under same condition had an $M_r$ ratio ($M_r^{//}/M_r^{\perp}$) of 0.39 and an $H_c$ ratio ($H_c^{//}/H_c^{\perp}$) of 0.36.

FIG. 2 shows an X-ray diffraction pattern of the deposited thin film obtained by successively forming the amorphous soft-magnetic layer, the NaCl-type oxide layer for orientation control composed of magnesium oxide and the magnetite thin film on a crystallized glass substrate, and then heat-treating the magnetite thin film to transform the magnetite thin film into the maghemite thin film. As shown in FIG. 2, although some diffraction peaks attributed to the crystallized glass substrate were observed, there were not found any diffraction peaks attributed to maghemite except for those attributed to the (400) plane thereof. Therefore, it was confirmed that the obtained maghemite thin film exhibited an excellent crystal orientation.

Figure 3:
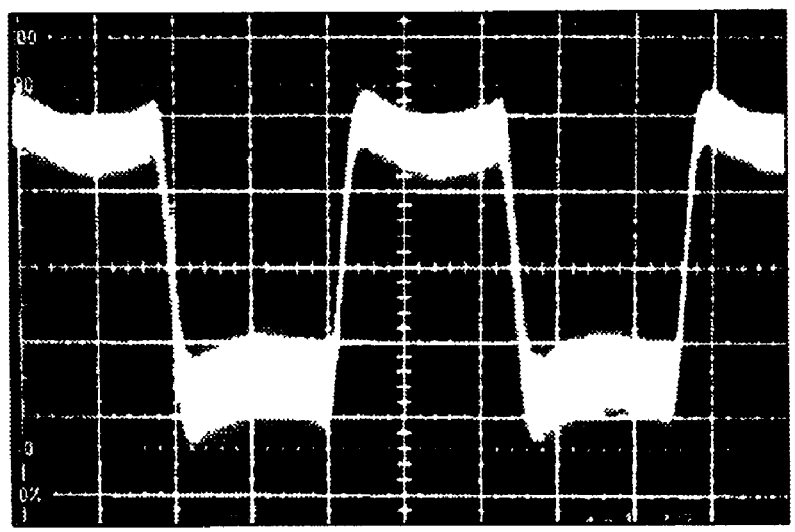
FIG. 3 shows an isolated reproduction waveform observed when recording 5 kFRPI signals on the perpendicular magnetic recording medium obtained in Example 2.

After the surface of the obtained medium was coated with a perfluoropolyether based lubricant "FOMBLIN Z DOL" (tradename, manufactured by Ausimont Co., Ltd.), the medium was tested to evaluate recording and reproducing properties thereof using an MR head having a specification including a write pole width of 1.9 µm, a shield gap of 0.21 µm, a read track width of 1.5 µm and a flying height of 35 nm as well as a spin stand "LS-90" (manufactured by Kyodo Denshi System Co., Ltd.) at a linear speed of 11.43 m/s and a sense current of 10 $mA_{DC}$. As shown in FIG. 3, the rectangular reproduction waveforms were obtained.

Examples 3 to 12

The same procedure as defined in Example 1 was conducted except that the thickness of the NaCl-type oxide layer and the amount of cobalt used upon deposition of the Co-containing magnetite thin film were changed variously, thereby obtaining perpendicular magnetic recording media.

Example 13 (Production Method (c))

After depositing the Co-containing magnetite thin film by the same method as defined in Example 1, the obtained Co-containing magnetite thin film was successively treated within the same apparatus by sputtering a metal alloy target (Fe+3 wt. % Co) at 150° C. in an oxygen-rich atmosphere containing oxygen and argon and having an oxygen flow rate of 74 CCM, an oxygen partial pressure of 0.12 Pa and a total pressure of 0.40 Pa, thereby forming a Co-containing maghemite thin film.

Example 14

The same procedure as defined in Example 1 was conducted except that an NiO layer was formed as the NaCl-type oxide layer, thereby obtaining a perpendicular magnetic recording medium. It was confirmed that the obtained NiO thin film had a spacing of (200) plane of 0.2089 μm.

Comparative Examples 1 to 5

In Comparative Example 1, the same procedure as defined in Example 1 was conducted except that the maghemite thin film was directly formed on the substrate without the NaCl-type oxide layer, thereby obtaining a magnetic recording medium. In Comparative Examples 2 to 4, the same procedure as defined in Example 1 was conducted except that the thickness of the NaCl-type oxide layer was changed to 10, 20 and 30 nm, respectively, thereby forming a maghemite thin film and obtaining magnetic recording media. In Comparative Example 5, the same procedure as defined in Example 1 was conducted except that the heat treatment for transforming magnetite into maghemite was omitted, thereby forming a magnetite thin film and obtaining a magnetic recording medium.

Essential production conditions are shown in Table 1, and various properties of the obtained perpendicular magnetic recording media are shown in Table 2.

It was confirmed that the spacing of (200) plane of the NaCl-type oxide layer for orientation control of the respective perpendicular magnetic recording media obtained in Examples 3 to 14 was larger than the spacing of (400) plane inherent to maghemite

Examples 16 to 26 and 28 to 32

The same procedure as defined in Example 2 was conducted except that the oxygen flow rate and amount of cobalt used upon deposition of the Co-containing magnetite thin film, the thickness of the soft-magnetic layer, the thickness of the NaCl-type oxide layer for orientation control and the thickness of the maghemite layer were changed variously, thereby obtaining perpendicular magnetic recording media.

Example 27

The same procedure as defined in Example 2 was conducted except that the temperature for transforming the magnetite thin film into the maghemite thin film was changed, thereby obtaining a perpendicular magnetic recording medium.

Example 33

The same procedure as defined in Example 2 was conducted except that an Fe based alloy layer was formed as the soft-magnetic layer, thereby obtaining a perpendicular magnetic recording medium.

Example 34 (Production Method (c))

After depositing the Co-containing magnetite thin film by the same method as defined in Example 2, the obtained multi-layered film was successively treated within the same apparatus by sputtering a metal alloy target (Fe+3 wt. % Co) at 150° C. in an oxygen-rich atmosphere containing oxygen and argon and having an oxygen flow rate of 74 CCM, an oxygen partial pressure of 0.12 Pa and a total pressure of 0.40 Pa, thereby obtaining a Co-containing maghemite thin film.

Example 35

The same procedure as defined in Example 2 was conducted except that an NiO layer was formed as the NaCl-type oxide layer for orientation control, thereby obtaining a perpendicular magnetic recording medium. Meanwhile, it was confirmed that the spacing of (200) plane of the obtained NiO layer was 0.2089 nm.

Comparative Examples 6 to 10

In Comparative Example 6, after depositing a thin film as the soft-magnetic backing layer by the same method as defined in Example 3, the magnetite thin film was formed on the soft-magnetic layer without formation of the NaCl-type oxide layer for orientation control, and then the obtained magnetite thin film was oxidized, thereby a magnetic recording medium. In Comparative Examples 7 to 9, the same procedure as defined in Example 1 was conducted except that the thickness of the NaCl-type oxide layer for orientation control was changed to 10, 20 and 30 nm, respectively, thereby obtaining perpendicular magnetic recording media. In Comparative Example 10, the same procedure as defined in Example 1 was conducted except that the magnetite thin film was not subjected to oxidation treatment, thereby obtaining a magnetic recording medium.

Essential production conditions are shown in Table 3, and various properties of the obtained perpendicular magnetic recording media are shown in Table 4.

It was confirmed that the spacing of (200) plane of the NaCl-type oxide layer for orientation control of the respective perpendicular magnetic recording media obtained in Examples 9 to 35 was larger than the spacing of (400) plane inherent to maghemite.

Meanwhile, the magnetic properties and surface properties of the respective soft-magnetic layers obtained by changing kinds and compositions thereof are shown in Table 5.

TABLE 1

| Examples and Comparative Examples | NaCl-type oxide layer for orientation control | |
|---|---|---|
| | Kind | Thickness (nm) |
| Example 3 | MgO | 2.0 |
| Example 4 | MgO | 8.0 |
| Example 5 | MgO | 5.0 |
| Example 6 | MgO | 5.0 |

TABLE 1-continued

| | | |
|---|---|---|
| Example 7 | MgO | 5.0 |
| Example 8 | MgO | 5.0 |
| Example 9 | MgO | 1.4 |
| Example 10 | MgO | 2.0 |
| Example 11 | MgO | 2.8 |
| Example 12 | MgO | 3.5 |
| Example 13 | MgO | 5.0 |
| Example 14 | NiO | 5.0 |
| Comparative Example 1 | — | — |
| Comparative Example 2 | MgO | 10.0 |
| Comparative Example 3 | MgO | 20.0 |
| Comparative Example 4 | MgO | 30.0 |
| Comparative Example 5 | MgO | 5.0 |

| | Conditions for formation of recording layer | | |
|---|---|---|---|
| Examples and Comparative Examples | Co content (wt. %) | Oxygen flow rate (CCM) | Substrate temperature (° C.) |
| Example 3 | 3 | 20 | 150 |
| Example 4 | 3 | 20 | 150 |
| Example 5 | 3 | 20 | 150 |
| Example 6 | 8 | 20 | 150 |
| Example 7 | 8 | 20 | 150 |
| Example 8 | 8 | 20 | 150 |
| Example 9 | 8 | 20 | 150 |
| Example 10 | 8 | 20 | 150 |
| Example 11 | 8 | 20 | 150 |
| Example 12 | 8 | 20 | 150 |
| Example 13 | 3 | 20 | 150 |
| Example 14 | 3 | 20 | 150 |
| Comparative Example 1 | 3 | 20 | 150 |
| Comparative Example 2 | 3 | 20 | 150 |
| Comparative Example 3 | 3 | 20 | 150 |
| Comparative Example 4 | 3 | 20 | 150 |
| Comparative Example 5 | 3 | 20 | 150 |

| | Oxidation treatment | | |
|---|---|---|---|
| Examples and Comparative Examples | Oxidation treatment process | Treating temperature (° C.) | Treating time (hr) |
| Example 3 | Heat treatment in air | 300 | 1 |
| Example 4 | Heat treatment in air | 300 | 1 |
| Example 5 | Heat treatment in air | 300 | 1 |
| Example 6 | Heat treatment in air | 300 | 1 |
| Example 7 | Heat treatment in air | 300 | 1 |
| Example 8 | Heat treatment in air | 300 | 1 |
| Example 9 | Heat treatment in air | 300 | 1 |
| Example 10 | Heat treatment in air | 300 | 1 |
| Example 11 | Heat treatment in air | 300 | 1 |
| Example 12 | Heat treatment in air | 300 | 1 |
| Example 13 | Sputtering in oxygen-rich atmosphere | 150 | 3 sec |
| Example 14 | Heat treatment in air | 300 | 1 |
| Comparative Example 1 | Heat treatment in air | 300 | 1 |
| Comparative Example 2 | Heat treatment in air | 300 | 1 |
| Comparative Example 3 | Heat treatment in air | 300 | 1 |
| Comparative Example 4 | Heat treatment in air | 300 | 1 |
| Comparative Example 5 | — | — | — |

TABLE 2

| | Properties of magnetic recording medium | | |
|---|---|---|---|
| Examples and Comparative Examples | Thickness of NaCl-type oxide layer for orientation control (nm) | Thickness of recording layer (nm) | Co content (wt. %) |
| Example 3 | 2.0 | 20.0 | 3 |
| Example 4 | 8.0 | 20.0 | 3 |
| Example 5 | 5.0 | 30.0 | 3 |
| Example 6 | 5.0 | 13.0 | 8 |
| Example 7 | 5.0 | 20.0 | 8 |
| Example 8 | 5.0 | 30.0 | 8 |
| Example 9 | 1.4 | 12.5 | 8 |
| Example 10 | 2.0 | 12.5 | 8 |
| Example 11 | 2.8 | 12.5 | 8 |
| Example 12 | 3.5 | 12.5 | 8 |
| Example 13 | 5.0 | 28.0 | 3 |
| Example 14 | 5.0 | 28.0 | 3 |
| Comparative Example 1 | — | 20.0 | 3 |
| Comparative Example 2 | 10.0 | 20.0 | 3 |
| Comparative Example 3 | 20.0 | 20.0 | 3 |
| Comparative Example 4 | 30.0 | 20.0 | 3 |
| Comparative Example 5 | 5.0 | 20.0 | 3 |

| | Properties of magnetic recording medium Magnetic properties | | | | |
|---|---|---|---|---|---|
| Examples and Comparative Examples | Coercive force (kA/m) | (Oe) | Squareness ($M_r/M_s$) | $M_r$ ratio ($M_r^{//}/M_r^{\perp}$) | $H_c$ ratio ($H_c^{//}/H_c^{\perp}$) |
| Example 3 | 260.7 | 3,276 | 0.80 | 0.37 | 0.30 |
| Example 4 | 299.9 | 3,769 | 0.76 | 0.48 | 0.42 |
| Example 5 | 373.1 | 4,688 | 0.89 | 0.29 | 0.27 |
| Example 6 | 460.0 | 5,780 | 0.91 | 0.27 | 0.29 |
| Example 7 | 615.4 | 7,733 | 0.87 | 0.26 | 0.25 |
| Example 8 | 760.0 | 9,551 | 0.89 | 0.21 | 0.23 |
| Example 9 | 473.6 | 5,951 | 0.84 | 0.32 | 0.27 |
| Example 10 | 438.9 | 5,515 | 0.88 | 0.28 | 0.26 |
| Example 11 | 454.3 | 5,709 | 0.86 | 0.24 | 0.26 |
| Example 12 | 458.2 | 5,758 | 0.85 | 0.26 | 0.22 |
| Example 13 | 199.8 | 2,511 | 0.82 | 0.39 | 0.26 |
| Example 14 | 308.0 | 3,871 | 0.86 | 0.34 | 0.31 |
| Comparative Example 1 | 324.0 | 4,072 | 0.36 | 1.04 | 0.83 |
| Comparative Example 2 | 255.0 | 3,205 | 0.50 | 0.90 | 0.59 |
| Comparative Example 3 | 176.1 | 2,213 | 0.33 | 1.00 | 1.10 |
| Comparative Example 4 | 175.3 | 2,203 | 0.32 | 1.10 | 1.20 |
| Comparative Example 5 | 31.4 | 395 | 0.15 | 0.98 | 2.58 |

| | Properties of magnetic recording medium | | |
|---|---|---|---|
| Examples and Comparative Examples | Surface electrical resistance (MΩ) | Surface roughness $R_a$ (nm) | $R_{max}$ (nm) |
| Example 3 | 7,100 | 1.2 | 12.6 |
| Example 4 | 7,000 | 1.1 | 12.3 |
| Example 5 | 5,400 | 0.9 | 12.0 |
| Example 6 | 8,200 | 0.8 | 9.4 |
| Example 7 | 6,100 | 0.8 | 10.3 |
| Example 8 | 1,200 | 1.0 | 12.3 |
| Example 9 | 28,000 | 1.0 | 11.7 |
| Example 10 | 21,000 | 0.8 | 11.2 |

TABLE 2-continued

| | | | |
|---|---|---|---|
| Example 11 | 21,000 | 0.8 | 10.4 |
| Example 12 | 17,000 | 0.7 | 9.1 |
| Example 13 | 1,800 | 0.8 | 9.3 |
| Example 14 | 1,500 | 0.7 | 8.1 |
| Comparative Example 1 | 5,400 | 1.4 | 18.4 |
| Comparative Example 2 | 4,600 | 1.5 | 18.6 |
| Comparative Example 3 | 4,500 | 1.6 | 19.1 |
| Comparative Example 4 | 4,400 | 1.6 | 19.3 |
| Comparative Example 5 | 0.08 | 0.5 | 6.8 |

TABLE 3

Production conditions of magnetic recording medium
Soft-magnetic layer

| Examples | Kind | Thickness (nm) |
|---|---|---|
| Example 15 | $Co_{87}Zr_5Nb_8$ | 400 |
| Example 16 | $Co_{87}Zr_5Nb_8$ | 400 |
| Example 17 | $Co_{87}Zr_5Nb_8$ | 400 |
| Example 18 | $Co_{87}Zr_5Nb_8$ | 400 |
| Example 19 | $Co_{87}Zr_5Nb_8$ | 400 |
| Example 20 | $Co_{87}Zr_5Nb_8$ | 400 |
| Example 21 | $Co_{87}Zr_5Nb_8$ | 400 |
| Example 22 | $Co_{87}Zr_5Nb_8$ | 400 |
| Example 23 | $Co_{87}Zr_5Nb_8$ | 400 |
| Example 24 | $Co_{87}Zr_5Nb_8$ | 100 |
| Example 25 | $Co_{87}Zr_5Nb_8$ | 200 |
| Example 26 | $Co_{87}Zr_5Nb_8$ | 600 |
| Example 27 | $Co_{87}Zr_5Nb_8$ | 400 |
| Example 28 | $Co_{87}Zr_5Nb_8$ | 400 |
| Example 29 | $Co_{87}Zr_5Nb_8$ | 400 |
| Example 30 | $Co_{87}Zr_5Nb_8$ | 400 |
| Example 31 | $Co_{87}Zr_5Nb_8$ | 400 |
| Example 32 | $Co_{87}Si_5Nb_8$ | 400 |
| Example 33 | $Fe_{98.5}Si_{1.5}$ | 400 |
| Example 34 | $Co_{87}Zr_5Nb_8$ | 400 |
| Example 35 | $Co_{87}Zr_5Nb_8$ | 400 |

Production conditions of magnetic recording medium
NaCl-type oxide layer for orientation control

| Examples | Kind | Thickness (nm) |
|---|---|---|
| Example 15 | MgO | 5.0 |
| Example 16 | MgO | 5.0 |
| Example 17 | MgO | 5.0 |
| Example 18 | MgO | 5.0 |
| Example 19 | MgO | 5.0 |
| Example 20 | MgO | 5.0 |
| Example 21 | MgO | 5.0 |
| Example 22 | MgO | 2.0 |
| Example 23 | MgO | 8.0 |
| Example 24 | MgO | 5.0 |
| Example 25 | MgO | 5.0 |
| Example 26 | MgO | 5.0 |
| Example 27 | MgO | 5.0 |
| Example 28 | MgO | 2.5 |
| Example 29 | MgO | 2.5 |
| Example 30 | MgO | 2.5 |
| Example 31 | MgO | 2.5 |
| Example 32 | MgO | 3.5 |
| Example 33 | MgO | 5.0 |
| Example 34 | MgO | 5.0 |
| Example 35 | NiO | 5.0 |

TABLE 3-continued

Production conditions of magnetic recording medium
Conditions for formation of recording layer

| Examples | Co content (wt. %) | Oxygen flow rate (CCM) | Substrate temperature (° C.) |
|---|---|---|---|
| Example 15 | 3 | 18 | 150 |
| Example 16 | 3 | 20 | 150 |
| Example 17 | 3 | 20 | 150 |
| Example 18 | 3 | 20 | 150 |
| Example 19 | 8 | 20 | 150 |
| Example 20 | 8 | 18 | 150 |
| Example 21 | 8 | 18 | 150 |
| Example 22 | 8 | 18 | 150 |
| Example 23 | 8 | 18 | 150 |
| Example 24 | 3 | 20 | 150 |
| Example 25 | 3 | 20 | 150 |
| Example 26 | 3 | 20 | 150 |
| Example 27 | 3 | 20 | 150 |
| Example 28 | 8 | 18 | 150 |
| Example 29 | 8 | 18 | 150 |
| Example 30 | 8 | 18 | R.T. |
| Example 31 | 8 | 18 | 80 |
| Example 32 | 3 | 20 | 150 |
| Example 33 | 3 | 22 | 150 |
| Example 34 | 3 | 28 | 150 |
| Example 35 | 3 | 18 | 150 |

Production conditions of magnetic recording medium
Oxidation treatment

| Examples | Oxidation treatment process | Treating temperature (° C.) | Treating time (hr) |
|---|---|---|---|
| Example 15 | Heat treatment in air | 300 | 1 |
| Example 16 | Heat treatment in air | 300 | 1 |
| Example 17 | Heat treatment in air | 300 | 1 |
| Example 18 | Heat treatment in air | 300 | 1 |
| Example 19 | Heat treatment in air | 300 | 1 |
| Example 20 | Heat treatment in air | 300 | 1 |
| Example 21 | Heat treatment in air | 300 | 1 |
| Example 22 | Heat treatment in air | 300 | 1 |
| Example 23 | Heat treatment in air | 300 | 1 |
| Example 24 | Heat treatment in air | 300 | 1 |
| Example 25 | Heat treatment in air | 300 | 1 |
| Example 26 | Heat treatment in air | 300 | 1 |
| Example 27 | Heat treatment in air | 250 | 1 |
| Example 28 | Heat treatment in air | 250 | 1 |
| Example 29 | Heat treatment in air | 250 | 1 |
| Example 30 | Heat treatment in air | 250 | 1 |
| Example 31 | Heat treatment in air | 250 | 1 |
| Example 32 | Heat treatment in air | 300 | 1 |
| Example 33 | Heat treatment in air | 300 | 1 |
| Example 34 | Sputtering in oxygen-rich atmosphere | 150 | 3 sec |
| Example 35 | Heat treatment in air | 300 | 1 |

TABLE 4

Production conditions of magnetic recording medium
Soft-magnetic layer

| Comparative Examples | Kind | Thickness (nm) |
|---|---|---|
| Comparative Example 6 | $Co_{87}Zr_5Nb_8$ | 400 |
| Comparative Example 7 | $Co_{87}Zr_5Nb_8$ | 400 |
| Comparative Example 8 | $Co_{87}Zr_5Nb_8$ | 400 |

TABLE 4-continued

Production conditions of magnetic recording medium

| Comparative Examples | | | |
|---|---|---|---|
| Comparative Example 9 | Co$_{87}$Zr$_5$Nb$_8$ | 400 | |
| Comparative Example 10 | Co$_{87}$Zr$_5$Nb$_8$ | 400 | |

NaCl-type oxide layer for orientation control

| Comparative Examples | Kind | Thickness (nm) |
|---|---|---|
| Comparative Example 6 | — | — |
| Comparative Example 7 | MgO | 10.0 |
| Comparative Example 8 | MgO | 20.0 |
| Comparative Example 9 | MgO | 30.0 |
| Comparative Example 10 | MgO | 5.0 |

Conditions for formation of recording layer

| Comparative Examples | Co content (wt. %) | Oxygen flow rate (CCM) | Substrate temperature (° C.) |
|---|---|---|---|
| Comparative Example 6 | 3 | 20 | 150 |
| Comparative Example 7 | 3 | 20 | 150 |
| Comparative Example 8 | 3 | 20 | 150 |
| Comparative Example 9 | 3 | 20 | 150 |
| Comparative Example 10 | 8 | 20 | 150 |

Oxidation treatment

| Comparative Examples | Oxidation treatment process | Treating temperature (° C.) | Treating time (hr) |
|---|---|---|---|
| Comparative Example 6 | Heat treatment in air | 300 | 1 |
| Comparative Example 7 | Heat treatment in air | 300 | 1 |
| Comparative Example 8 | Heat treatment in air | 300 | 1 |
| Comparative Example 9 | Heat treatment in air | 300 | 1 |
| Comparative Example 10 | — | — | — |

TABLE 5

Properties of magnetic recording medium

| Examples | Thickness of soft-magnetic layer (nm) | Thickness of inter-mediate layer (nm) | Thickness of recording layer (nm) | Co content (wt. %) |
|---|---|---|---|---|
| Example 15 | 400 | 5.0 | 20 | 3 |
| Example 16 | 400 | 5.0 | 18 | 3 |
| Example 17 | 400 | 5.0 | 30 | 3 |
| Example 18 | 400 | 5.0 | 10 | 3 |
| Example 19 | 400 | 5.0 | 20 | 8 |
| Example 20 | 400 | 5.0 | 13 | 8 |
| Example 21 | 400 | 5.0 | 30 | 8 |
| Example 22 | 400 | 2.0 | 20 | 3 |
| Example 23 | 400 | 8.0 | 20 | 3 |
| Example 24 | 100 | 5.0 | 28 | 3 |
| Example 25 | 200 | 5.0 | 28 | 3 |
| Example 26 | 600 | 5.0 | 28 | 3 |
| Example 27 | 400 | 5.0 | 28 | 3 |
| Example 28 | 400 | 2.5 | 18 | 8 |
| Example 29 | 400 | 2.5 | 10 | 8 |
| Example 30 | 400 | 2.5 | 18 | 8 |
| Example 31 | 400 | 2.5 | 18 | 8 |
| Example 32 | 400 | 3.5 | 20 | 3 |
| Example 33 | 400 | 5.0 | 28 | 3 |
| Example 34 | 400 | 5.0 | 28 | 3 |
| Example 35 | 400 | 5.0 | 28 | 3 |

Properties of magnetic recording medium

| Examples | Surface roughness R$_a$ (nm) | Surface roughness R$_{max}$ (nm) | Surface electrical resistance (kΩ) |
|---|---|---|---|
| Example 15 | 0.9 | 11.4 | 2,000 |
| Example 16 | 0.8 | 9.9 | 2,500 |
| Example 17 | 1.0 | 11.9 | 1,900 |
| Example 18 | 0.7 | 9.2 | 4,000 |
| Example 19 | 0.7 | 10.0 | 2,000 |
| Example 20 | 0.7 | 8.5 | 3,800 |
| Example 21 | 0.8 | 9.3 | 1,200 |
| Example 22 | 0.8 | 9.1 | 7,700 |
| Example 23 | 0.9 | 10.7 | 4,700 |
| Example 24 | 0.7 | 8.8 | 1,500 |
| Example 25 | 0.7 | 8.9 | 5,400 |
| Example 26 | 0.8 | 9.4 | 3,400 |
| Example 27 | 0.8 | 9.2 | 2,800 |
| Example 28 | 0.9 | 12.0 | 5,000 |
| Example 29 | 0.9 | 10.7 | 2,000 |
| Example 30 | 0.7 | 9.6 | 1,800 |
| Example 31 | 0.7 | 10.1 | 1,500 |
| Example 32 | 0.8 | 10.5 | 2,400 |
| Example 33 | 1.2 | 12.5 | 1,500 |
| Example 34 | 0.5 | 6.3 | 2,500 |
| Example 35 | 0.8 | 9.5 | 3,400 |

Magnetic properties of magnetic recording medium

| Examples | Coercive force (kA/m) | Coercive force (Oe) | Squareness (M$_r$/M$_s$) |
|---|---|---|---|
| Example 15 | 382.0 | 4,800 | 0.89 |
| Example 16 | 246.7 | 3,100 | 0.86 |
| Example 17 | 270.6 | 3,400 | 0.78 |
| Example 18 | 151.2 | 1,900 | 0.70 |
| Example 19 | 628.7 | 7,900 | 0.86 |
| Example 20 | 461.5 | 5,800 | 0.96 |
| Example 21 | 756.0 | 9,500 | 0.85 |
| Example 22 | 306.4 | 3,850 | 0.84 |
| Example 23 | 374.0 | 4,700 | 0.75 |
| Example 24 | 278.5 | 3,500 | 0.70 |
| Example 25 | 382.0 | 4,800 | 0.88 |
| Example 26 | 389.9 | 4,900 | 0.88 |
| Example 27 | 382.0 | 4,800 | 0.88 |
| Example 28 | 529.2 | 6,650 | 0.91 |
| Example 29 | 336.6 | 4,230 | 0.92 |
| Example 30 | 643.0 | 8,080 | 0.91 |
| Example 31 | 590.5 | 7,420 | 0.93 |
| Example 32 | 269.0 | 3,380 | 0.93 |
| Example 33 | 278.5 | 3,500 | 0.70 |
| Example 34 | 285.7 | 3,590 | 0.86 |
| Example 35 | 342.2 | 4,300 | 0.86 |

TABLE 6

Properties of magnetic recording medium

| Comparative Examples | Thickness of soft-magnetic layer (nm) | Thickness of intermediate layer (nm) | Thickness of recording layer (nm) | Co content (wt. %) |
|---|---|---|---|---|
| Comparative Example 6 | 400 | — | 20 | 3 |
| Comparative Example 7 | 400 | 10.0 | 20 | 3 |
| Comparative Example 8 | 400 | 20.0 | 20 | 3 |
| Comparative Example 9 | 400 | 30.0 | 20 | 3 |
| Comparative Example 10 | 400 | 5.0 | 20 | 3 |

Properties of magnetic recording medium

| Comparative Examples | Surface roughness $R_a$ (nm) | Surface roughness $R_{max}$ (nm) | Surface electrical resistance (kΩ) |
|---|---|---|---|
| Comparative Example 6 | 0.3 | 4.5 | 25.0 |
| Comparative Example 7 | 0.8 | 10.7 | 1,200 |
| Comparative Example 8 | 0.8 | 10.9 | 120 |
| Comparative Example 9 | 0.9 | 11.3 | 90 |
| Comparative Example 10 | 0.4 | 5.3 | 50 |

Magnetic properties of magnetic recording medium

| Comparative Examples | Coercive force (kA/m) | Coercive force (Oe) | Squareness ($M_r/M_s$) |
|---|---|---|---|
| Comparative Example 6 | 397.9 | 5,000 | 0.54 |
| Comparative Example 7 | 254.6 | 3,200 | 0.50 |
| Comparative Example 8 | 175.1 | 2,200 | 0.33 |
| Comparative Example 9 | 175.1 | 2,200 | 0.32 |
| Comparative Example 10 | 37.4 | 470 | 0.16 |

TABLE 7

Properties of soft-magnetic layer

| Soft-magnetic layer Kind | Thickness (nm) | $B_s$ (Wb/m²) |
|---|---|---|
| $Co_{87}Zr_5Nb_8$ | 400 | 15.1 |
| $Co_{90.6}Zr_{3.4}Nb_{6.0}$ | 400 | 17.6 |
| $Fe_{98.5}Si_{1.5}$ | 400 | 22.6 |

TABLE 7-continued

Properties of soft-magnetic layer

| Product of saturation magnetic flux density and thickness ($B_s \cdot t$) | | Coercive force $H_c$ | |
|---|---|---|---|
| Wb/m² | G·μm | A/m | Oe |
| 6.03 × 10⁻⁶ | 4,800 | 79.6 | 1.0 |
| 7.04 × 10⁻⁶ | 5,600 | 246.7 | 3.1 |
| 9.05 × 10⁻⁶ | 7,200 | 541.1 | 6.8 |

| Anisotropic field $H_k$ | | $R_a$ | $R_{max}$ |
|---|---|---|---|
| kA/m | Oe | (nm) | (nm) |
| 1.19 | 15.0 | 0.33 | 5.81 |
| 1.59 | 20.0 | 0.36 | 4.98 |
| 2.00 | 25.1 | 0.67 | 9.01 |

What is claimed is:

1. A perpendicular magnetic recording medium, comprising:

a substrate;

a soft-magnetic layer formed on the substrate;

an oxide layer having an NaCl crystalline structure for orientation control formed on the soft-magnetic layer, having a thickness of from more than 0 to less than 10 nm;

a magnetic recording layer formed on the oxide layer having an NaCl crystalline structure for orientation control, comprising a maghemite thin film, wherein a product ($B_s$ t) of a saturation magnetic flux density ($B_s$) and a thickness (t) of the soft-magnetic layer is in the range of 1.13 to 13.57×10⁻⁶ Wb/m (80 to 1,100 G·μm), the perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to a surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

2. A perpendicular magnetic recording medium according to claim 1, wherein said oxide layer having an NaCl crystalline structure for orientation control has a spacing of (200) plane larger than an inherent spacing (0.2086 nm) of (400) plane of maghemite constituting the magnetic recording layer.

3. A perpendicular magnetic recording medium according to claim 1, wherein said soft-magnetic layer is composed of Co—Zr—Nb alloy, Co—Zr—Ta alloy, Fe—Si alloy, Fe—Si—Al alloy, Fe—B alloy, Fe—C alloy, Fe—Ta—N alloy, Ni—Fe alloy or Mn—Zn ferrite.

4. A perpendicular magnetic recording medium according to claim 1, wherein said oxide layer having an NaCl crystalline structure is composed of AmO, BaO, CaO, CdO, CeO, CoO, EuO, FeO, MgO, MnO, NdO, NiO, NpO, SmO, SrO, TiO, VO or YbO.

5. A perpendicular magnetic recording medium according to claim 1, wherein said oxide layer having an NaCl crystalline structure for orientation control has a thickness of 1 to 9 nm.

6. A perpendicular magnetic recording medium according to claim 1, wherein said magnetic recording layer has a thickness of 5 to 80 nm.

7. A perpendicular magnetic recording medium according to claim 1, wherein said magnetic recording layer has a center-line mean roughness ($R_a$) of 0.1 to 1.5 nm and a maximum height ($R_{max}$) of 1 to 15 nm.

8. A perpendicular magnetic recording medium according to claim 1, which comprises a surface electrical resistance of 100 to 8,000 kΩ in the case of using the soft-magnetic layer composed of metal or alloy, and 100 to 30,000 MΩ in the case of using the soft-magnetic layer composed of an oxide.

9. A perpendicular magnetic recording medium, comprising:

a substrate;

an oxide layer having an NaCl crystalline structure for orientation control formed on the substrate, having a thickness of from more than 0 to less than 10 nm; and a magnetic recording layer formed on the oxide layer having an NaCl crystalline structure for orientation control, comprising a maghemite thin film, and said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

10. A perpendicular magnetic recording medium according to claim 9, wherein said oxide layer having an NaCl crystalline structure for orientation control has a spacing of (200) plane larger than an inherent spacing (0.2086 nm) of (400) plane of maghemite constituting the magnetic recording layer.

11. A perpendicular magnetic recording medium according to claim 9, wherein said oxide layer having an NaCl crystalline structure is composed of AmO, BaO, CaO, CdO, CeO, CoO, EuO, FeO, MgO, MnO, NdO, NiO, NpO, SmO, SrO, TiO, VO or YbO.

12. A perpendicular magnetic recording medium according to claim 9, wherein said oxide layer having an NaCl crystalline structure for orientation control has a thickness of 1 to 9 nm.

13. A perpendicular magnetic recording medium according to claim 9, wherein said magnetic recording layer has a thickness of 5 to 80 nm.

14. A perpendicular magnetic recording medium according to claim 9, wherein said magnetic recording layer has a center-line mean roughness ($R_a$) of 0.1 to 1.5 nm and a maximum height ($R_{max}$) of 1 to 15 nm.

15. A perpendicular magnetic recording medium according to claim 9, having an electrical resistance of 100 to 30,000 MΩ.

16. A perpendicular magnetic recording medium, comprising:

a substrate;

a soft-magnetic layer formed on the substrate;

an oxide layer having an NaCl crystalline structure for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the oxide layer having an NaCl crystalline structure for orientation control, comprising a maghemite thin film, the perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to a surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

17. A perpendicular magnetic recording medium, comprising:

a substrate;

a soft-magnetic layer formed on the substrate, having a product ($B_s \cdot t$) of a saturation magnetic flux density ($B_s$) and a thickness (t) of the soft-magnetic layer of 1.13 to 13.57×10$^{-6}$ Wb/m (80 to 1,100 G·μm);

an oxide layer having an NaCl crystalline structure for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the oxide layer having an NaCl crystalline structure for orientation control, comprising a maghemite thin film, the perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to a surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5: and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

18. A perpendicular magnetic recording medium, comprising:

a substrate;

a soft-magnetic layer formed on the substrate, having a product ($B_s \cdot t$) of a saturation magnetic flux density ($B_s$) and a thickness (t) of the soft-magnetic layer being in the range of 1.13 to 13.57×10$^{-6}$ Wb/m (80 to 1,100 G·μm);

an oxide layer having an NaCl crystalline structure for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the oxide layer having an NaCl crystalline structure for orientation control, comprising a maghemite thin film, and said perpendicular magnetic recording medium having a coercive force in a perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

19. A perpendicular magnetic recording medium, comprising:

a substrate;

a soft-magnetic layer formed on the substrate, having a product ($B_s \cdot t$) of a saturation magnetic flux density ($B_s$) and a thickness (t) of the soft-magnetic layer being in the range of 1.13 to 13.57×10$^{-6}$ Wb/m (80 to 1,100 G·$\mu$m);

an oxide layer having an NaCl crystalline structure for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the oxide layer having an NaCl crystalline structure for orientation control, comprising a maghemite thin film and having a center-line mean roughness ($R_a$) of 0.1 to 1.5 nm and a maximum height ($R_{max}$) of 1 to 15 nm; and said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

20. A perpendicular magnetic recording medium, comprising:

a substrate;

a soft-magnetic layer formed on the substrate, having a product ($B_s \cdot t$) of a saturation magnetic flux density ($B_s$) and a thickness (t) of the soft-magnetic layer being in the range of 1.13 to 13.57×10$^{-6}$ Wb/m (80 to 1,100 G·$\mu$m);

an oxide layer having an NaCl crystalline structure for orientation control formed on the soft-magnetic layer, having a thickness of from more than 0 to less than 10 nm and a spacing of (200) plane larger than an inherent spacing (0.2086 nm) of (400) plane of maghemite constituting the magnetic recording layer; and a magnetic recording layer formed on the oxide layer having an NaCl crystalline structure for orientation control, comprising a maghemite thin film and having a center-line mean roughness ($R_a$) of 0.1 to 1.5 nm and a maximum height ($R_{max}$) of 1 to 15 nm; and said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5; and an electrical resistance of 100 to 8,000 k$\Omega$ in the case of using the soft-magnetic layer made of metal or alloy, or 100 to 30,000 M$\Omega$ in the case of using the soft-magnetic layer made of an oxide.

21. A perpendicular magnetic recording medium, comprising:

a substrate;

an oxide layer having an NaCl crystalline structure for orientation control formed on the substrate, having a thickness of from more than 0 to less than 10 nm and an inherent spacing of (200) plane larger than a spacing (0.2086 nm) of (400) plane of maghemite constituting the magnetic recording layer; and a magnetic recording layer formed on the oxide layer having an NaCl crystalline structure for orientation control, comprising a maghemite thin film and having a center-line mean roughness ($R_a$) of 0.1 to 1.5 nm and a maximum height ($R_{max}$) of ito 15 nm, said perpendicular magnetic recording medium having a coercive force in perpendicular direction of not less than 159 kA/m (2,000 Oe); a squareness ($M_r/M_s$) of not less than 0.7 obtained without compensation of demagnetizing field when magnetized in a direction perpendicular to surface of the magnetic recording layer; an $M_r$ ratio ($M_r^{//}/M_r^{\perp}$) of a residual magnetization ($M_r^{//}$) obtained when magnetized in in-plane direction to a residual magnetization ($M_r^{\perp}$) obtained when magnetized in perpendicular direction, of not more than 0.5; and an $H_c$ ratio ($H_c^{//}/H_c^{\perp}$) of a coercive force ($H_c^{//}$) obtained when magnetized in in-plane direction to a coercive force ($H_c^{\perp}$) obtained when magnetized in perpendicular direction, of not more than 0.5.

* * * * *